United States Patent
Park et al.

(10) Patent No.: US 10,911,754 B2
(45) Date of Patent: Feb. 2, 2021

(54) IMAGE CODING METHOD USING HISTORY-BASED MOTION INFORMATION AND APPARATUS FOR THE SAME

(71) Applicant: LG ELECTRONICS INC., Seoul (KR)

(72) Inventors: Naeri Park, Seoul (KR); Junghak Nam, Seoul (KR); Hyeongmoon Jang, Seoul (KR); Jaeho Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/818,677

(22) Filed: Mar. 13, 2020

(65) Prior Publication Data
US 2020/0260072 A1    Aug. 13, 2020

Related U.S. Application Data

(63) Continuation of application No. PCT/KR2019/012992, filed on Oct. 4, 2019.
(Continued)

(51) Int. Cl.
| | | |
|---|---|---|
| *H04N 19/105* | (2014.01) | |
| *H04N 19/132* | (2014.01) | |
| *H04N 19/176* | (2014.01) | |
| *H04N 19/423* | (2014.01) | |
| *H04N 19/533* | (2014.01) | |
| *H04N 19/70* | (2014.01) | |

(52) U.S. Cl.
CPC ........ *H04N 19/105* (2014.11); *H04N 19/132* (2014.11); *H04N 19/176* (2014.11); *H04N 19/423* (2014.11); *H04N 19/533* (2014.11); *H04N 19/70* (2014.11)

(58) Field of Classification Search
None
See application file for complete search history.

(56) References Cited

U.S. PATENT DOCUMENTS 9,294,776 B2 * 3/2016 Rapaka ............... H04N 19/82
9,467,707 B2 * 10/2016 Rapaka ............... H04N 19/70
(Continued)

FOREIGN PATENT DOCUMENTS

KR    20140105039 A    9/2014
KR    20150003239 A *  1/2015 ............ H04N 19/17
(Continued)

OTHER PUBLICATIONS

Wu et al., "CE4-related: CTU-level Initialization of History-based Motion Vector Prediction", JVET of ITU-T SG 16 WP 3 and ISO/IEC JTC 1/SC 29/WG 11, 12th Meeting, Macao, China, Oct. 3-12, 2018, Document JVET-L0575-v1 (Year: 2018).*
(Continued)

*Primary Examiner* — Reza Aghevli
(74) *Attorney, Agent, or Firm* — Dentons US LLP

(57) ABSTRACT

According to an embodiment disclosed in the present specification, a history-based motion vector prediction (HMVP) candidate set with respect to a current block may be derived based on a history, the HMVP candidate set may be updated or initialized according to a condition, and motion information of the current block may be derived based on the HMVP candidate set, through which inter prediction efficiency can be improved.

15 Claims, 30 Drawing Sheets

Related U.S. Application Data

(60) Provisional application No. 62/742,269, filed on Oct. 5, 2018.

(56) References Cited

U.S. PATENT DOCUMENTS

| | | | | |
|---|---|---|---|---|
| 9,473,779 | B2* | 10/2016 | Rapaka | H04N 19/50 |
| 9,578,339 | B2* | 2/2017 | Rapaka | H04N 19/70 |
| 9,729,873 | B2* | 8/2017 | Wang | H04N 19/52 |
| 9,838,684 | B2* | 12/2017 | Coban | H04N 19/174 |
| 10,291,923 | B2* | 5/2019 | Hendry | H04N 19/70 |
| 10,382,791 | B2* | 8/2019 | Chien | H04N 19/423 |
| 2013/0188720 | A1* | 7/2013 | Wang | H04N 19/147 |
| | | | | 375/240.16 |
| 2013/0272370 | A1* | 10/2013 | Coban | H04N 19/174 |
| | | | | 375/240.01 |
| 2014/0098851 | A1* | 4/2014 | Chen | H04N 19/46 |
| | | | | 375/240.02 |
| 2014/0254666 | A1* | 9/2014 | Rapaka | H04N 19/17 |
| | | | | 375/240.12 |
| 2014/0254667 | A1* | 9/2014 | Rapaka | H04N 19/82 |
| | | | | 375/240.12 |
| 2014/0254668 | A1* | 9/2014 | Rapaka | H04N 19/50 |
| | | | | 375/240.12 |
| 2014/0254669 | A1* | 9/2014 | Rapaka | H04N 19/80 |
| | | | | 375/240.12 |
| 2016/0261868 | A1* | 9/2016 | Chien | H04N 19/70 |
| 2017/0289570 | A1* | 10/2017 | Zhou | H04N 19/436 |
| 2017/0347109 | A1* | 11/2017 | Hendry | H04N 19/96 |

FOREIGN PATENT DOCUMENTS

| | | |
|---|---|---|
| KR | 20150003239 A | 1/2015 |
| WO | 2015138008 A1 | 9/2015 |

OTHER PUBLICATIONS

W. Xu et al., "CE4-related: CTU-level Initialization of History-based Motion Vector Prediction", JVET-L0575-v1, Joint Video Experts Team (JVET) of ITU-T SG 16 WP 3 and ISO/IEC JTC 1/SC 29/WG 11, 12th Meeting: Macao, CN, Oct. 3-12, 2018.

* cited by examiner

IMAGE CODING METHOD USING HISTORY-BASED MOTION INFORMATION AND APPARATUS FOR THE SAME

CROSS-REFERENCE TO RELATED APPLICATIONS

Pursuant to 35 U.S.C. § 119(e), this application is a continuation of International Application PCT/KR2019/012992, with an international filing date of Oct. 4, 2019, which claims the benefit of U.S. Provisional Application No. 62/742,269 filed on Oct. 5, 2018, the contents of which are all hereby incorporated by reference herein in their entirety.

TECHNICAL FIELD

The present disclosure relates to image coding and, more particularly, to an image coding method using history-based motion information and an apparatus for the method.

BACKGROUND

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

A technical object of the present specification is to provide a method for improving image coding efficiency and an apparatus for the method.

Another technical object of the present specification is to provide an efficient inter prediction method and an apparatus for the method.

Yet another technical object of the present specification is to provide a method for deriving a history-based motion vector and an apparatus for the method.

Still another technical object of the present specification is to provide a method for efficiently deriving a history-based motion vector prediction (HMVP) candidate and an apparatus for the method.

Still yet another technical object of the present specification is to provide a method for efficiently updating an HMVP buffer and an apparatus for the method.

A still yet further technical object of the present specification is to provide a method for efficiently initializing an HMVP buffer and an apparatus for the method.

According to one embodiment of the present specification, an image decoding method performed by a decoding apparatus is provided. The method comprises deriving a history-based motion vector prediction (HMVP) candidate set with respect to a current block; constructing a motion information candidate list based on HMVP candidates belonging to the HMVP candidate set; deriving motion information of the current block based on the motion information candidate list; generating prediction samples for the current block based on the motion information; and generating reconstructed samples based on the prediction samples, wherein the HMVP candidate set is updated based on motion information of a previous block in a CTU row in a current tile, wherein the CTU row comprising the current block, wherein the HMVP candidate set is initialized at a specific CTU in the CTU row comprising the current block, and the specific CTU is a firstly-ordered CTU among CTUs of the CTU row in a current picture or the specific CTU is a firstly-ordered CTU among CTUs of the CTU row in the current tile.

According to another one embodiment of the present specification, a decoding apparatus performing image decoding is provided. The decoding apparatus comprises a predictor deriving a history-based motion vector prediction (HMVP) candidate set with respect to a current block, constructing a motion information candidate list based on HMVP candidates belonging to the HMVP candidate set, deriving motion information of the current block based on the motion information candidate list, and generating prediction samples for the current block based on the motion information; and a reconstructor generating reconstructed samples based on the prediction samples, wherein the HMVP candidate set is updated based on motion information of a previous block in a CTU row in a current tile, wherein the CTU row comprising the current block, wherein the HMVP candidate set is initialized at a specific CTU in the CTU row comprising the current block, and the specific CTU is a firstly-ordered CTU among CTUs of the CTU row in a current picture or the specific CTU is a firstly-ordered CTU among CTUs of the CTU row in the current tile.

According to yet another one embodiment of the present specification, an image encoding method performed by an encoding apparatus is provided. The method comprises deriving a history-based motion vector prediction (HMVP) candidate set with respect to a current block; constructing a motion information candidate list based on HMVP candidates belonging to the HMVP candidate set; deriving motion information of the current block based on the motion information candidate list; generating prediction samples for the current block based on the motion information; deriving residual samples based on the prediction samples; and encoding image information including information about the residual samples, wherein the HMVP candidate set is updated based on motion information of a previous block in a CTU row in a current tile, wherein the CTU row comprising the current block, wherein the HMVP candidate set is initialized at a specific CTU in the CTU row comprising the current block, and the specific CTU is a firstly-ordered CTU among CTUs of the CTU row in a current picture or the specific CTU is a firstly-ordered CTU among CTUs of the CTU row in the current tile.

According to still yet another embodiment of the present specification, an encoding apparatus performing image encoding is provided. The encoding apparatus comprises a predictor deriving a history-based motion vector prediction (HMVP) candidate set with respect to a current block, constructing a motion information candidate list based on HMVP candidates belonging to the HMVP candidate set, deriving motion information of the current block based on the motion information candidate list, and generating prediction samples for the current block based on the motion information; a residual processor deriving residual samples based on the prediction samples; and an entropy encoder encoding image information including information about the residual samples, wherein the HMVP candidate set is updated based on motion information of a previous block in a CTU row in a current tile, wherein the CTU row comprising the current block, wherein the HMVP candidate set is initialized at a specific CTU in the CTU row comprising the current block, and the specific CTU is a firstly-ordered CTU among CTUs of the CTU row in a current picture or the specific CTU is a firstly-ordered CTU among CTUs of the CTU row in the current tile.

According to a still yet further embodiment of the present specification, a digital storage medium storing image data including encoded image information generated according to an image encoding method performed by an encoding apparatus is provided.

According to an additional embodiment of the present specification, a digital storage medium storing image data including encoded image information that triggers the image decoding method to be performed by a decoding apparatus is provided.

According to one embodiment of the present specification, the overall image/video compression efficiency may be improved.

According to one embodiment of the present specification, an amount of data transmitted for processing residuals may be reduced through efficient inter prediction.

According to one embodiment of the present specification, HMVP buffers may be managed efficiently.

According to one embodiment of the present specification, parallel processing may be supported through efficient HMVP buffer management.

According to one embodiment of the present specification, a motion vector for inter prediction may be derived efficiently.

DESCRIPTION OF EXEMPLARY EMBODIMENTS

Figure 1:
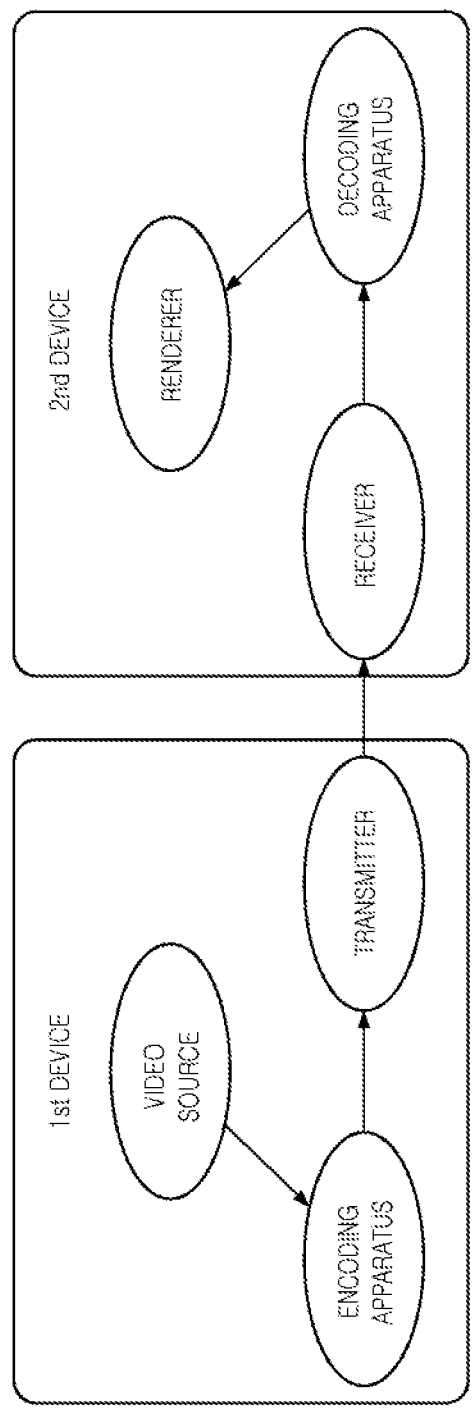
FIG. 1 illustrates an example of a video/image coding system to which embodiments of the present specification may be applied.

This document relates to video/image coding. For example, the method/embodiment disclosed in this document may be applied to the method disclosed in the versatile video coding (VVC) standard. In addition, the methods/embodiments disclosed in this document may be applied to a method disclosed in the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

The method presented in this document may be modified in various forms, and specific examples thereof will be described and illustrated in the drawings. The terms used in the following description are used to merely describe specific embodiment, but are not intended to limit the technical idea of the presented method in this document. An expression of a singular number includes an expression of 'at least one', so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, the respective structures in the drawings of the present specification are provided independently from each other for the convenience of describing different characteristic functions, which, however, does not indicate that each structure should be implemented by separate hardware or separate software. For example, each structure may be implemented by a combination of two or more structures, or one structure may be split into a plurality of structures. An embodiment in which structures are integrated into one and/or separated from each other should be regarded as belonging to the scope of the present specification unless it departs from the technical spirit of a method disclosed in the present specification.

In what follows, with reference to appended drawings, embodiments of the present specification will be described in more detail. In what follows, the same reference symbols are used for the same elements in the drawings, and repeated descriptions of the same elements will be omitted.

FIG. 1 illustrates an example of a video/image coding system to which embodiments of the present specification may be applied.

Referring to FIG. 1, a video/image coding system may include a first apparatus (source device) and a second apparatus (reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

In this document, a video may refer to a series of images over time. A picture generally refers to the unit representing one image at a particular time frame, and a slice/tile refers to the unit constituting the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specified sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In this document, a tile group and a slice may be used interchangeably. For example, in this document, a tile group/tile group header may also be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
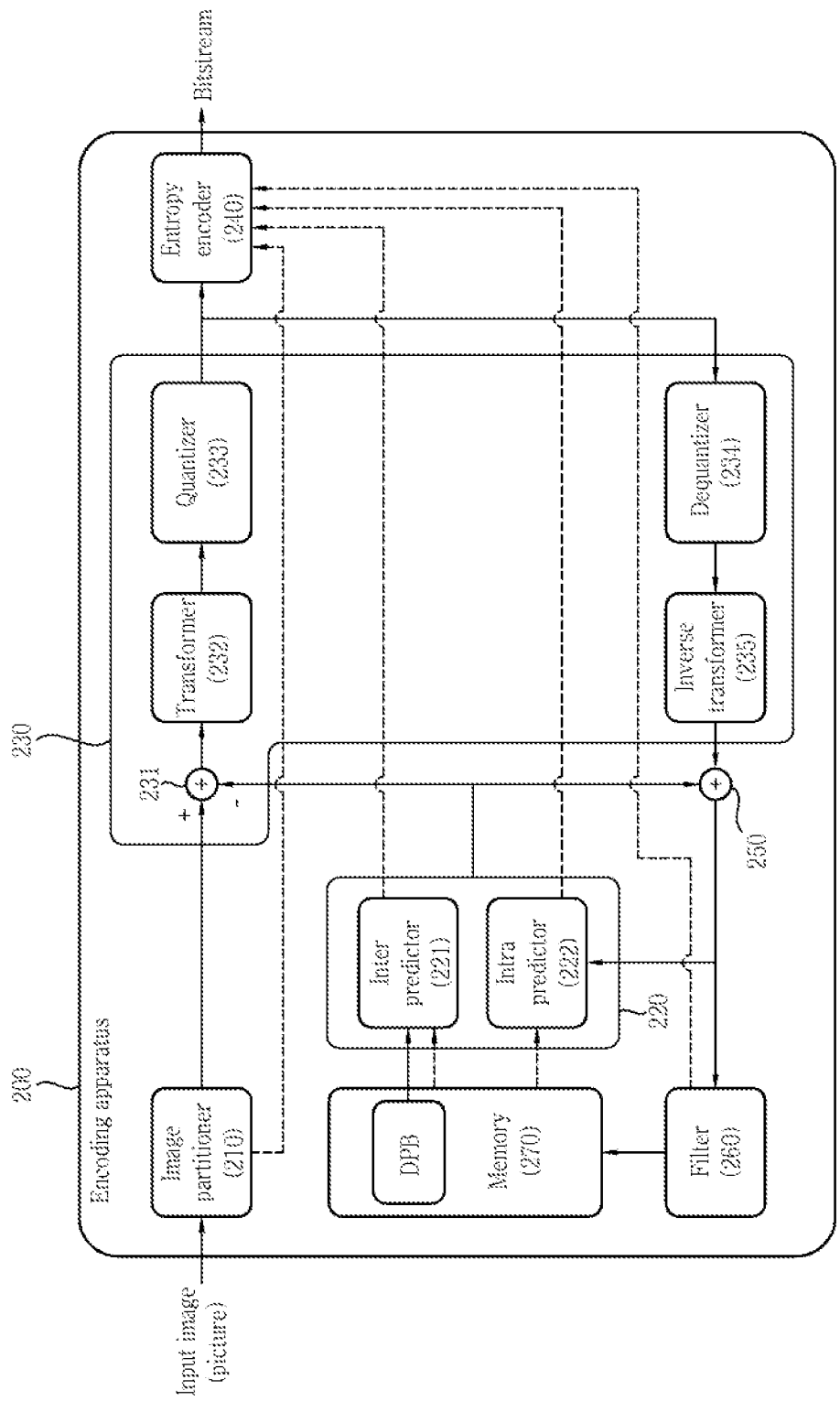
FIG. 2 illustrates a structure of a video/image encoding apparatus to which embodiments of the present specification may be applied.

FIG. 2 illustrates a structure of a video/image encoding apparatus to which embodiments of the present specification may be applied. In what follows, a video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
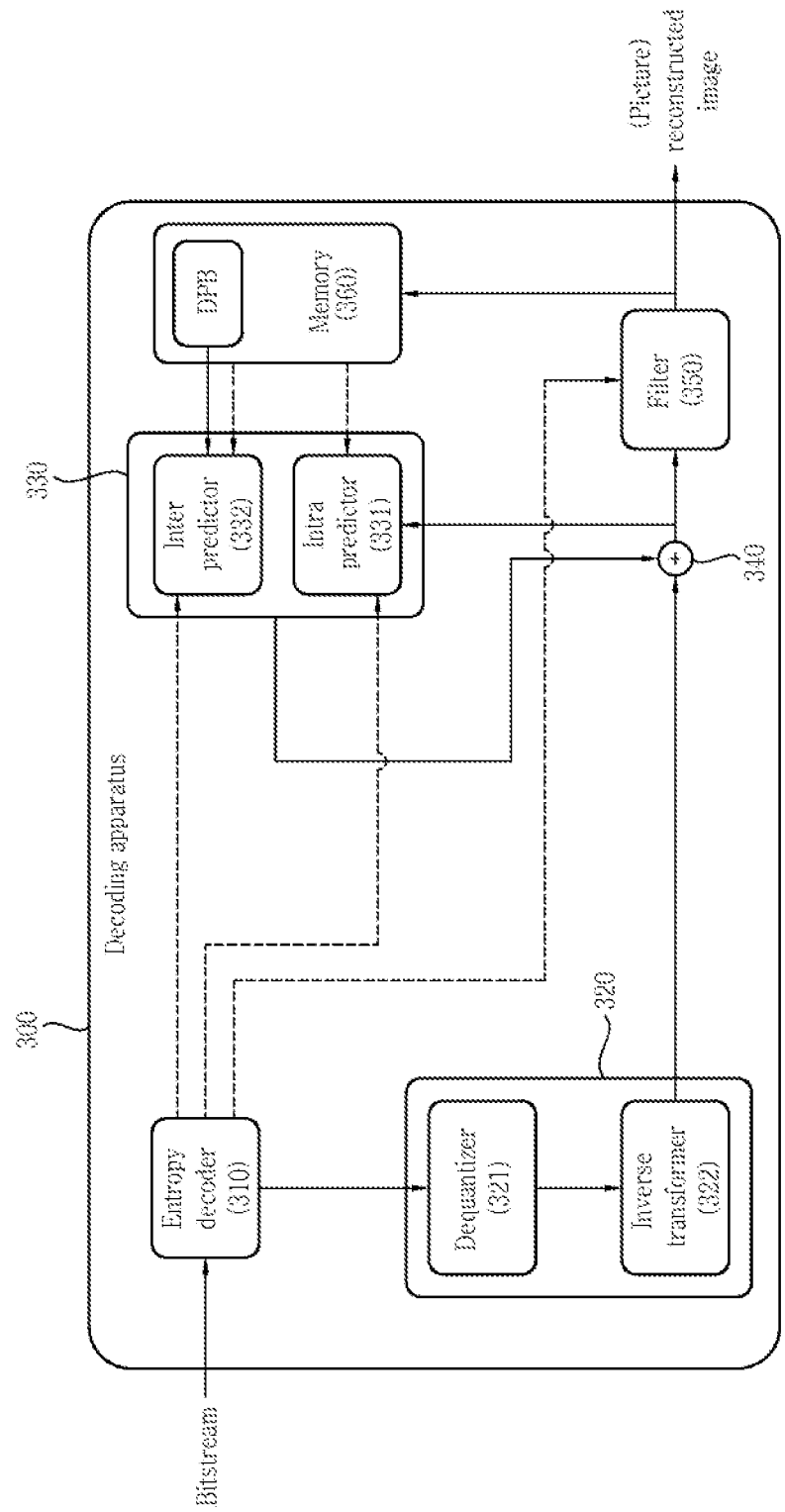
FIG. 3 illustrates a structure of a video/image decoding apparatus to which embodiments of the present specification may be applied.

FIG. 3 illustrates a structure of a video/image decoding apparatus to which embodiments of the present specification may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, prediction is performed to increase compression efficiency. By doing so, a prediction block including prediction samples with respect to a current block, which is a coding target block, may be generated. Here, the prediction block includes prediction samples in the spatial domain (or pixel domain). The prediction block is derived in both of the encoding and decoding apparatus, where the encoding apparatus may increase image coding efficiency by signaling information about residuals (residual information) between an original block and the prediction block, rather than original sample values of the original block, to the decoding apparatus. The decoding apparatus may derive a residual block including residual samples based on the residual information, generate a reconstructed block including reconstructed samples by combining the residual block and the prediction block, and generate a reconstructed picture including reconstructed blocks.

The residual information may be generated through a transform and quantization processes. For example, the encoding apparatus may derive a residual block between the original block and the prediction block, derive transform coefficients by performing the transform process to residual samples (residual sample array) included in the residual block, derive quantized transform coefficients by performing the quantization process on the transform coefficients, and signal related residual information to the decoding apparatus (through a bitstream). Here, the residual information may include information about the values of the quantized transform coefficients, position information, transform technique, transform kernel, and quantization parameters. The decoding apparatus may perform an inverse-quantization/inverse-transform process based on the residual information and derive residual samples (or residual block). The decoding apparatus may generate a reconstructed picture based on a prediction block and the residual block. Also, the encoding apparatus may derive a residual block by performing inverse quantization/inverse transform on the quantized transform coefficients to obtain a reference for inter prediction of a subsequent picture and generate a reconstructed picture by using the derived reconstructed block.

If inter prediction is applied, the prediction unit of the encoding/decoding apparatus may derive prediction samples by performing inter prediction in units of blocks. Inter prediction may be a prediction derived in a manner that is dependent on data elements (for example, sample values or motion information) of picture(s) other than the current picture. If inter prediction is applied to the current block, a prediction block (prediction sample array) with respect to the current block may be derived based on a reference block (reference sample array) specified by a motion vector on a reference picture indicated by a reference picture index. At this time, to reduce the amount of motion information transmitted in the inter prediction mode, motion information of the current block may be predicted in units of blocks, sub-blocks, or samples based on the correlation of motion information between a neighboring block and the current block. The motion information may include a motion vector and a reference picture index. The motion information may further include inter prediction type (L0 prediction, L1 prediction and Bi prediction) information. If inter prediction is applied, neighboring blocks may include spatial neighboring blocks existing within the current picture and temporal neighboring blocks existing in reference pictures. The reference picture containing the reference block may or may not be the same as the reference picture containing the temporal neighboring block. The temporal neighboring block may be referred to as a collocated reference block or collocated CU (colCU), and a reference picture containing the temporal neighboring block may be referred to as a collocated picture (colPic). For example, a motion information candidate list may be constructed based on neighboring blocks of the current block, and a flag or index information indicating which candidate is selected (used) to derive a motion vector and/or a reference picture index of the current block may be signaled. Inter prediction may be performed based on various prediction modes; for example, in the case of a skip mode and a (normal) merge node, motion information of the current block may be the same as the motion information of a selected neighboring block. In the case of skip mode, differently from the case of merge mode, a residual signal may not be transmitted. In the case of motion vector prediction (MVP) mode, a motion vector of a selected neighboring block is used as a motion vector prediction, and a motion vector difference may be signaled. In this case, a motion vector of the current block may be derived by using a sum of the motion vector predictor and the motion vector difference.

A video/image encoding process based on inter prediction may briefly include the following steps as described below.

Figure 4:
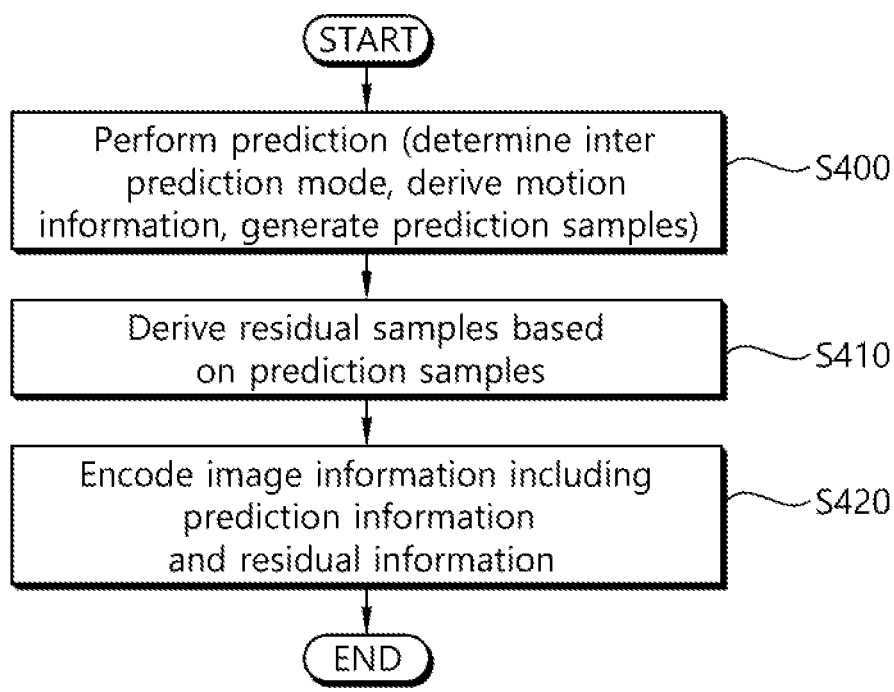
FIG. 4 illustrates an example of an inter prediction-based video/image encoding method.

FIG. 4 illustrates an example of an inter prediction-based video/image encoding method.

The encoding apparatus performs inter prediction on a current block S400. The encoding apparatus may derive the inter prediction mode and motion information of the current block and generate prediction samples of the current block. Here, procedures for determining the inter prediction mode, deriving motion information, and generating prediction samples may be performed simultaneously or one procedure may precede the others. For example, the inter prediction unit of the encoding apparatus may include a prediction mode determining unit, motion information deriving unit, and prediction sample deriving unit, where the prediction mode determining unit may determine a prediction mode with respect to the current block, the motion information deriving unit may derive motion information of the current block, and the prediction sample deriving unit may derive prediction samples of the current block. For example, the inter prediction unit of the encoding apparatus may search a predetermined region (search region) of reference pictures for a block similar to the current block through motion estimation and derive a reference block the difference of which from the current block is a minimum or less than a predetermined threshold. Based on the derived reference block, a reference picture index indicating a reference picture in which the reference block is contained, and a motion vector may be derived based on a position difference between the reference block and the current block. The encoding apparatus may determine a mode applied to the current block among various prediction modes. The encoding apparatus may compare RD costs with respect to the various prediction modes and determine the optimal prediction mode for the current block.

For example, if skip mode or merge mode is applied to the current block, the encoding apparatus may construct a merge candidate list to be described later and among reference blocks indicated by the merge candidates belonging to the merge candidate list, derive a reference block, the difference of which from the current block is a minimum or less than a predetermined threshold. In this case, a merge candidate associated with the derived reference block is selected, and merge index information indicating the selected merged candidate is generated and signaled to the decoding apparatus. By using the motion information of the selected merge candidate, motion information of the current block may be derived.

As another example, if (A)MVP mode is applied to the current block, the encoding apparatus may construct an (A)MVP candidate list to be described later and use a motion vector of an MVP candidate selected from among motion vector predictor (MVP) candidates belonging to the (A)MVP candidate list as the MVP of the current block. In this case, for example, a motion vector indicating a reference block derived from the motion estimation may be used as a motion vector of the current block, and the MVP candidate having a motion vector exhibiting the smallest difference from the motion vector of the current block among the MVP candidates may become the selected MVP candidate. A motion vector difference (MVD) which is a difference obtained by subtracting the MVP from the motion vector of the current block may be derived. In this case, information about the MVD may be signaled to the decoding apparatus. Also, if (A)MVP mode is applied, the value of the reference picture index may be configured as reference picture index information and signaled separately to the decoding apparatus.

The encoding apparatus may derive residual samples based on the prediction samples S410. The encoding apparatus may derive the residual samples through comparison of original samples of the current block and the prediction samples.

The encoding apparatus encodes image information including prediction information and residual information S420. The encoding apparatus may output the encoded image information in the form of a bitstream. The prediction information is related to the prediction process, which includes prediction mode information (for example, skip flag, merge flag, or mode index) and information about motion information. The information about motion information may include candidate selection information (for example, merge index, MVP flag or MVP index) which is the information for deriving a motion vector. Also, the information about motion information may include information about the MVD and/or reference picture index information. Also, the information about motion information may include information about whether L0 prediction, L1 prediction, or bi-prediction is applied. The residual information is the information related to the residual samples. The residual information may include information about quantized transform coefficients with respect to the residual samples.

The output bitstream may be stored in a (digital) storage medium and transmitted to the decoding apparatus or transmitted to the decoding apparatus through a network.

Meanwhile, as described above, the encoding apparatus may generate a reconstructed picture (including reconstructed samples and reconstructed blocks) based on the reference samples and the residual samples. This is so intended to derive the same prediction result from the encoding apparatus as performed in the decoding apparatus, through which coding efficiency may be improved. Therefore, the encoding apparatus may store the reconstructed picture (or reconstructed samples or reconstructed blocks) in a memory and use the reconstructed picture as a reference picture for inter prediction. As described above, an in-loop filtering process may be further applied to the reconstructed picture.

A video/image decoding process based on inter prediction may briefly include the following steps as described below.

Figure 5:
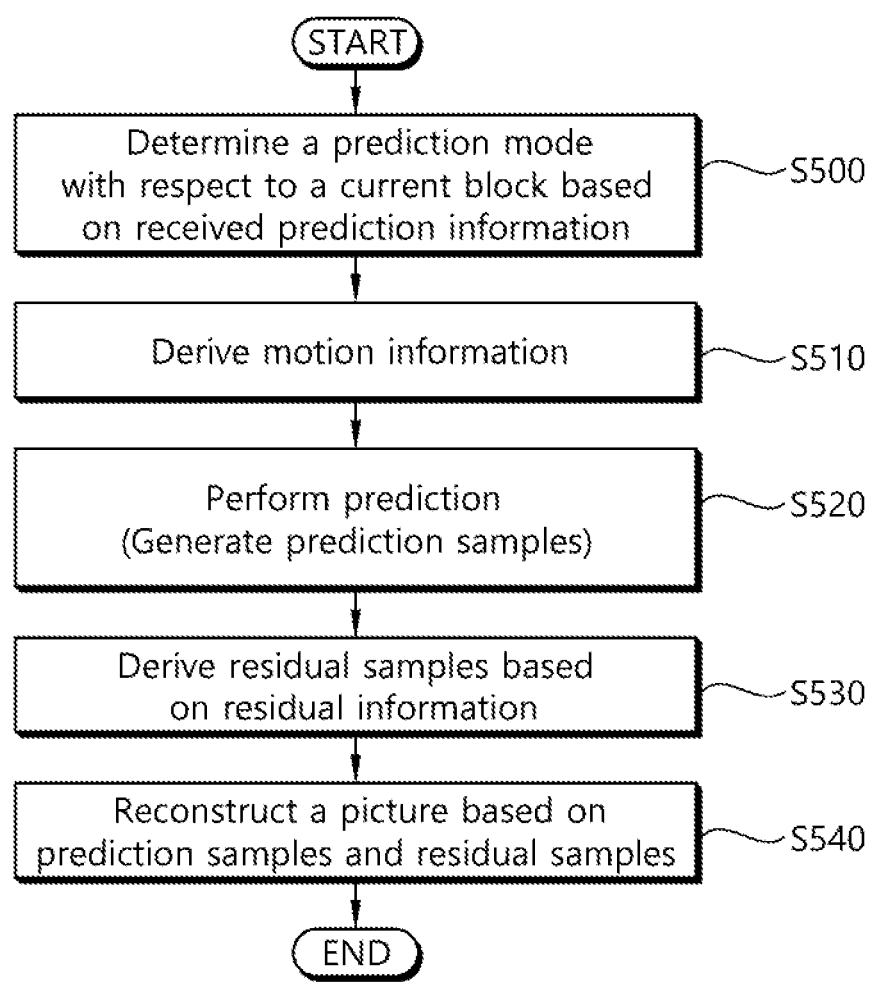
FIG. 5 illustrates an example of an inter prediction-based video/image decoding method.

FIG. 5 illustrates an example of an inter prediction-based video/image decoding method.

Referring to FIG. 5, the decoding apparatus may perform operation corresponding to the operation performed by the encoding apparatus. The decoding apparatus may perform prediction with respect to a current block and derive prediction samples based on received prediction information.

More specifically, the decoding apparatus may determine a prediction mode with respect to the current block based on the received prediction information S500. The decoding apparatus may determine which inter prediction mode is applied to the current block based on prediction mode information within the prediction information.

For example, whether the merge mode is applied or (A)MVP mode is applied to the current block may be determined based on the merge flag. Or, one among various inter prediction mode candidates may be selected based on the mode index. The inter prediction mode candidates may include skip mode, merge mode and/or (A)MVP mode, or various inter prediction modes to be described later.

The decoding apparatus derives motion information of the current block based on the determined inter prediction mode S510. For example, if skip mode or merge mode is applied to the current block, the decoding apparatus may construct a merge candidate list to be described later and select one merge candidate among merge candidates belonging to the merge candidate list. The selection may be performed based on the aforementioned merge index. By using the motion information of the selected merge candidate, motion information of the current block may be derived. The motion information of the selected merge candidate may be used as motion information of the current block.

As another example, if (A)MVP mode is applied to the current block, the decoding apparatus may construct an (A)MVP candidate list to be described later and use a motion vector of an MVP candidate selected from among motion vector predictor (MVP) candidates belonging to the (A)MVP candidate list as the MVP of the current block. The selection may be performed based on the selection information described above (MVP flag or MVP index 0. In this case, based on the information about the MVD, an MVD of the current block may be derived, and a motion vector of the current block may be derived based on the MVP and the MVD of the current block. Also, based on the reference picture index information, a reference picture index of the current block may be derived. A picture indicated by the reference picture index within a reference picture list about the current block may be derived as a reference picture referenced for inter prediction of the current block.

Meanwhile, as described below, motion information of the current block may be derived without constructing a candidate list, and in this case, motion information of the current block may be derived according to the procedure disclosed in the prediction mode described below. In this case, construction of a candidate list as described above may be omitted.

The decoding apparatus may generate prediction samples with respect to the current block based on the motion information of the current block S520. In this case, the reference picture may be derived based on the reference picture index of the current block, and prediction samples of the current block may be derived by using samples of a reference block indicated on the reference picture by the motion vector of the current block. In this case, as described below, depending on the situations, a prediction sample filtering process may be further performed on the whole or part of the prediction samples of the current block.

For example, the inter prediction unit of the decoding apparatus may include a prediction mode determining unit, motion information deriving unit, and prediction sample deriving unit; determine a prediction mode with respect to the current block based on the prediction mode information received from the prediction mode determining unit, derive motion information of the current block (motion vector and/or reference picture index) based on the information about motion information received from the motion information deriving unit; and derive prediction samples of the current block in the prediction sample deriving unit.

The decoding apparatus generates residual samples with respect to the current block based on received residual information S530. The decoding apparatus may generate reconstructed samples with respect to the current block based on the prediction samples and the residual samples; and generate a reconstructed picture based on the generated reconstructed samples S540. As described above, an in-loop filtering process may be further applied to the reconstructed picture.

Figure 6:
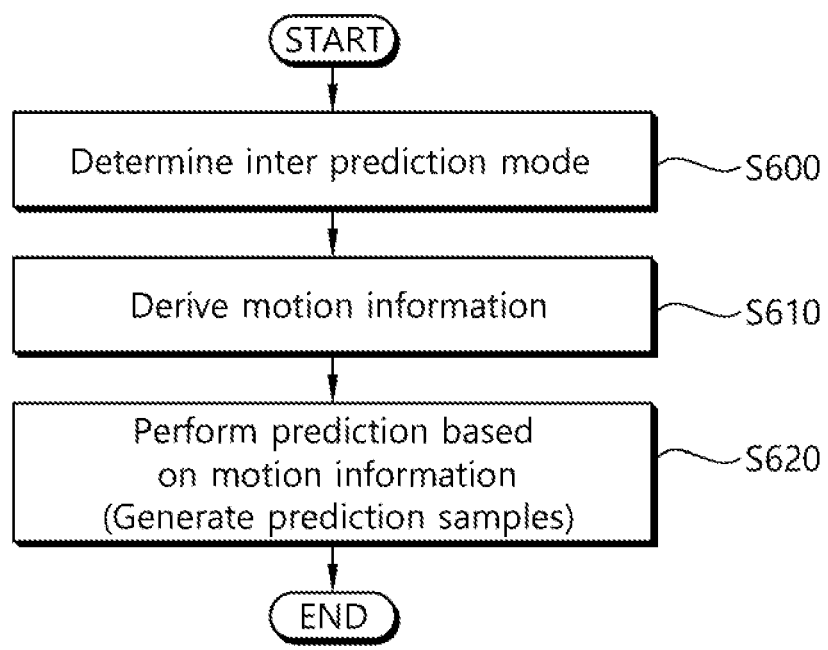
FIG. 6 illustrates an inter prediction procedure.

FIG. 6 illustrates an inter prediction procedure.

Referring to FIG. 6, as described above, the inter prediction procedure may include determining an inter prediction mode, deriving motion information according to a determined prediction mode, and performing prediction (prediction sample generation) based on derived motion information. The inter prediction procedure may be performed in the encoding and decoding apparatus as described above. In the present specification, a coding apparatus may include the encoding apparatus and/or the decoding apparatus.

Referring to FIG. 6, a coding apparatus determines an inter prediction mode with respect to a current block S600. Various inter prediction modes may be used for prediction of a current block in a picture. For example, various modes such as merge mode, skip mode, Motion Vector Prediction (MVP) mode, affine mode, sub-block merge mode, and Merge with MVD (MMVD) mode may be used. As an additional mode, Decoding side Motion Vector Refinement (DMVR) mode, Adaptive Motion Vector Resolution (AMVR) mode, Bi-prediction with CU-level weight (BCW), or Bi-directional Optical Flow (BDOF) may be further used or may be used instead. The affine mode may also be called an affine motion prediction mode. The MVP mode may also be called an Advanced Motion Vector Prediction (AMVP) mode. In the present specification, a motion information candidate derived by part of the modes may be incorporated into one of candidates related to motion information of other modes. For example, an HMVP candidate may be added as a merge candidate of the merge/skip mode or added as an MVP candidate of the MVP mode. If the HMVP candidate is used as a motion information candidate of the merge mode or skip mode, the HMVP candidate may be called an HMVP merge candidate.

Prediction mode information indicating the inter prediction mode of the current block may be signaled by the encoding apparatus to the decoding apparatus. The prediction mode information may be included in a bitstream and received by the decoding apparatus. The prediction mode information may include index information indicating one of a plurality of candidate modes. Or, the prediction mode information may indicate the inter prediction mode through layered signaling of flag information. In this case, the prediction mode information may include one or more flags. For example, whether to apply the skip mode may be indicated through signaling of a skip flag, whether to apply the merge mode may be indicated through signaling of a merge flag if application of the skip mode is not allowed, or application of the MVP mode may be indicated or a flag for additional delineation may be further signaled if application of the merge mode is not allowed. The affine mode may be signaled as an independent mode or signaled as a mode dependent on the merge ore MVP mode. For example, the affine mode may include the affine merge mode and affine MVP mode.

The coding apparatus derives motion information about the current block S610. The motion information may be derived based on the inter prediction mode.

The coding apparatus may perform inter prediction by using motion information of the current block. The encoding apparatus may derive optimal motion information with respect to the current block through a motion estimation procedure. For example, the encoding apparatus may search a predetermined search region within a reference picture for a reference block with a high similarity in fractional pixel units by using the original block within the original picture with respect to the current block, through which motion information may be derived. Similarity of a block may be derived based on a difference of phase-based sample values. For example, similarity of a block may be derived based on SAD between the current block (or a template of the current block) and the reference block (or a template of the reference block). In this case, motion information may be derived based on a reference block yielding the smallest SAD within the search region. The derived motion information may be signaled to the decoding apparatus according to various methods based on the inter prediction mode.

The coding apparatus performs inter prediction based on the motion information with respect to the current block S620. The coding apparatus may derive prediction sample(s) with respect to the current block based on the motion information. The current block including the prediction samples may be called a prediction block.

Meanwhile, regarding the inter prediction, according to the legacy merge or AMVP mode, a motion vector of a block spatially or temporally adjacent to a current block has been used as a motion information candidate to reduce the amount of motion information. For example, neighboring blocks used for deriving motion information candidates of a current block have included a neighboring block at the lower-left corner, a neighboring block on the left side, a neighboring block at the upper-right corner, a neighboring block on the upper side, and a neighboring block at the upper-left corner of the current block.

Figure 7:
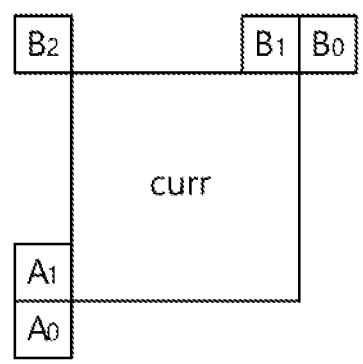
FIG. 7 illustrates spatial neighboring blocks used for deriving motion information candidates in the legacy merge or AMVP mode.

FIG. 7 illustrates spatial neighboring blocks used for deriving motion information candidates in the legacy merge or AMVP mode.

Basically, the spatial neighboring block has been limited to a block that adjoins a current block. This layout is intended to increase possibility of hardware implementation, which takes into account the fact that a hardware issue such as increase of a line buffer occurs to derive information of a block separated far from the current block. However, since use of motion information of a distant block to derive a motion information candidate of the current block allows to configure various candidates, performance improvement may be achieved. To use motion information of a distant block without increasing the line buffer, a history-based motion vector prediction (HMVP) method may be used. In the present specification, HMVP may indicate History-based Motion Vector Prediction or History-based Motion Vector Predictor. According to the present specification, inter prediction may be performed efficiently by using HMVP, and parallel processing may be supported. For example, embodiments of the present specification propose various methods for managing a history buffer for parallel processing, based on which parallel processing is supported. However, it should be noted that support of parallel processing does not indicate that parallel processing is necessarily performed, but the coding apparatus may or may not perform parallel processing in consideration of hardware performance or service type. For example, if the coding apparatus is equipped with a multi-core processor, the coding apparatus may process part of slices, bricks and/or tiles in parallel. Meanwhile, even if the coding apparatus is equipped with a single core processor or multi-core processor, the coding apparatus may perform sequential processing while reducing computational burden and memory usage.

The HMVP candidate according to the HMVP method may include motion information of a previously coded block. For example, according to a block coding order within a current picture, if a previously coded block is not adjacent to a current block, motion information of the previously coded block is not considered as the motion information of the current block. However, an HMVP candidate may be considered as a motion information candidate (for example, a merge candidate or an MVP candidate) of the current block without taking into account whether the previously coded block is adjacent to the current block. In this case, a plurality of HMVP candidates may be stored in a buffer. For example, if the merge mode is applied to a current block, an HMVP candidate (HMVP merge candidate) may be added to a merge candidate list. In this case, the HMVP candidate may be added next to the spatial merge candidates and temporal merge candidate included in the merge candidate list.

According to the HMVP method, motion information of a previously coded block may be stored in the form of a table and may be used as a motion information candidate (for example, merge candidate) of a current block. A table (buffer, list, or set) including a plurality of HMVP candidates may be maintained during the encoding/decoding process. The table (buffer, list, or set) may be referred to as an HMVP table (buffer, list, or set) or an HMVP candidate table (buffer, list, or set). According to one embodiment of the present specification, the table (buffer, list, or set) may be initialized if a new slice is encountered. Or according to one embodiment of the present specification, the table (buffer, list, or set) may be initialized if a new CTU row is encountered. If the table is initialized, the number of HMVP candidates belonging to the table may be set to 0. The size of the table (buffer or list) may be fixed to a specific value (for example, 5). For example, in the presence of an inter coded block, associated motion information may be added to the last entry of the table as a new HMVP candidate. The (HMVP) table may be referred to as (HMVP) buffer, (HMVP) list, or (HMVP) set.

Figure 8:
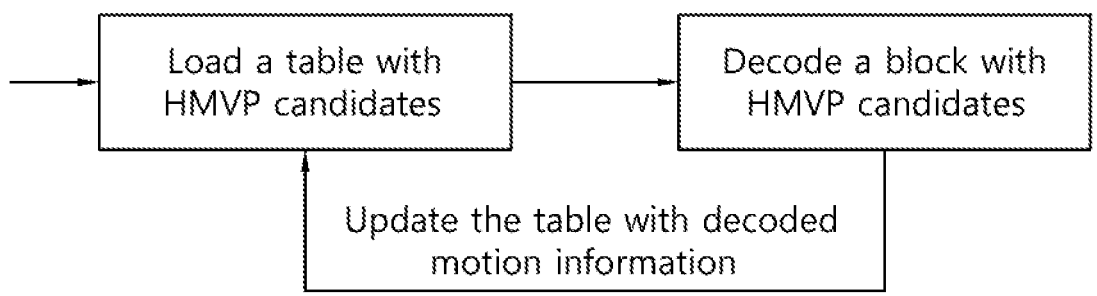
FIG. 8 illustrates an example of an HMVP candidate-based decoding process.

FIG. 8 illustrates an example of an HMVP candidate-based decoding process. Here, the HMVP candidate-based decoding process may include an HMVP candidate-based inter prediction process.

Referring to FIG. 8, the decoding apparatus loads an HMVP table including an HMVP candidate(s) and decodes a block based on at least one of the HMVP candidate(s). More specifically, for example, the decoding apparatus may derive motion information of a current block based on at least one of the HMVP candidate(s) and derive a prediction block (including prediction samples) by performing inter prediction with respect to the current block based on the motion information. As described above, a reconstructed block may be generated based on the prediction block. The table may be updated with the derived motion information of the current block. In this case, the motion information may be added to the last entry of the table as a new HMVP candidate. If the number of existing HMVP candidates included in the table equals the table size, a candidate that has been added first to the table may be deleted, and the derived motion information may be added to the last entry of the table as a new HMVP candidate.

Figure 9:
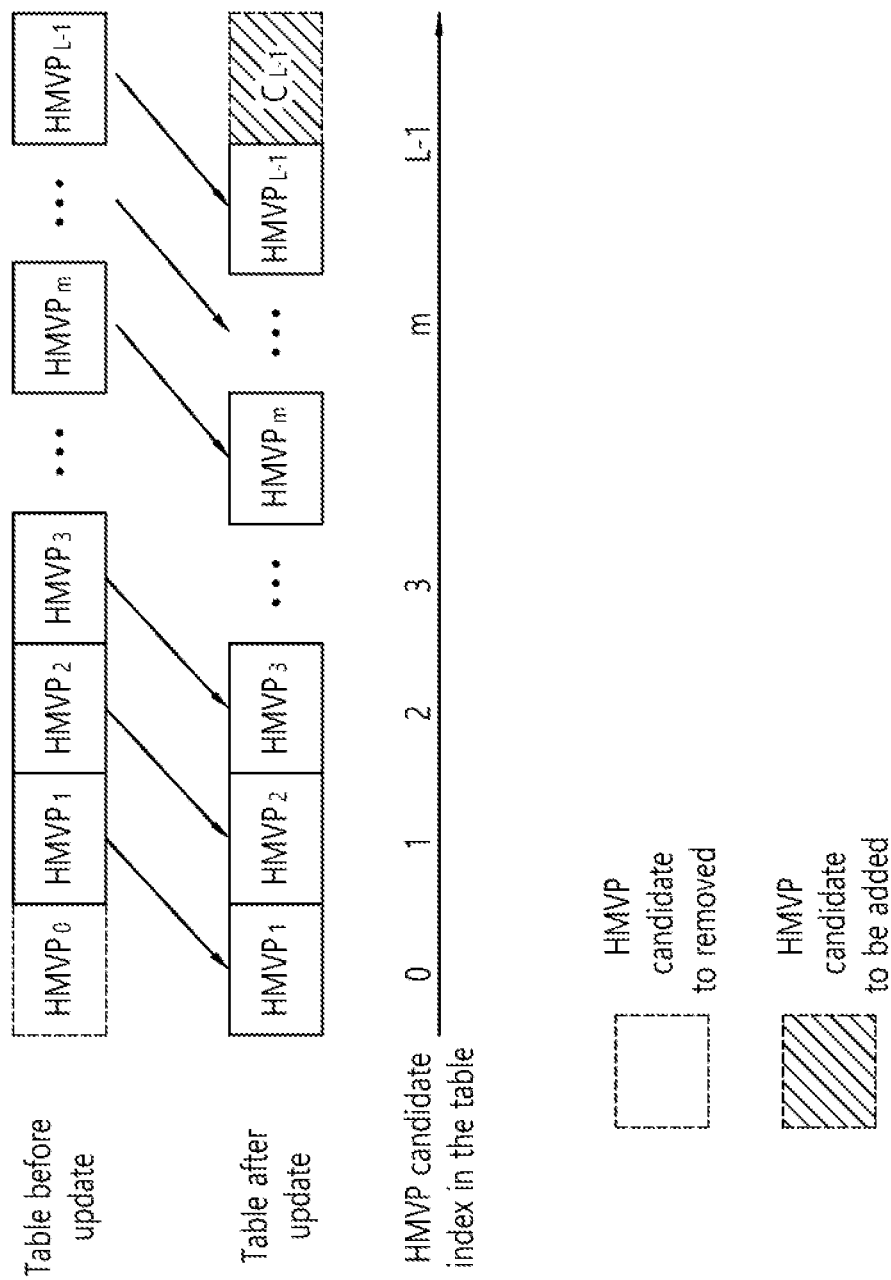
FIG. 9 illustrates an HMVP table update according to the FIFO rule.
Figure 10:
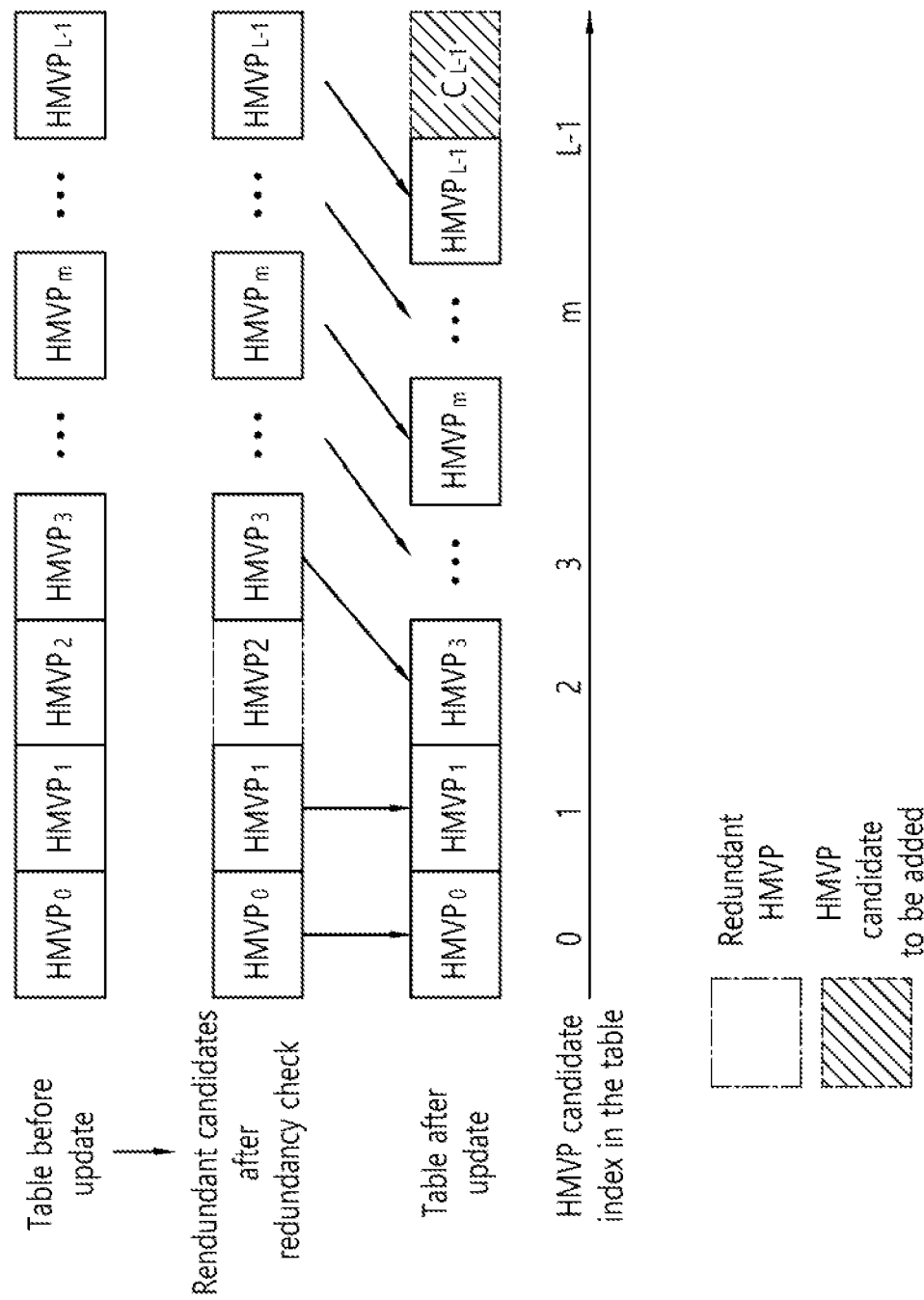
FIG. 10 illustrates an HMVP table update according to a limited FIFO rule.

FIG. 9 illustrates an HMVP table update according to the FIFO rule, and FIG. 10 illustrates an HMVP table update according to a limited FIFO rule.

The first-in-first-out (FIFO) rule may be applied to the table. For example, if the table size S is 16, it indicates that 16 HMVP candidates may be included in the table. If more than 16 HMVP candidates are generated from previously coded blocks, the FIFO rule may be applied, through which the table may include up to 16 most recently coded motion information candidates. In this case, as shown in FIG. 9, the FIFO rule is applied to remove the oldest HMVP candidate, and a new HMVP candidate may be added.

Meanwhile, to further improve coding efficiency, as shown in FIG. 10, a limited FIFO rule may be applied. Referring to FIG. 10, when an HMVP candidate is inserted to a table, redundancy check may be applied first. Through this operation, it may be determined whether an HMVP candidate having the same motion information already exists in the table. If an HMVP candidate having the same motion information exists in the table, the HMVP candidate having the same motion information is removed from the table, and HMVP candidates subsequent to the removed HMVP candidate are shifted by one position (namely, each index−1), after which a new HMVP candidate may be inserted.

As described above, HMVP candidate may be used in the merge candidate construction process. In this case, for example, all of HMVP candidates that may be inserted to the region from the last entry to the first entry within the table may be inserted next to spatial merge candidates and temporal merge candidate. In this case, a pruning check may be applied to HMVP candidates. The maximum allowed number of merge candidates may be signaled, and if the total number of available merge candidates reaches the maximum number of merge candidates, the merge candidate list construction process may be terminated.

Similarly, HMVP candidates may be used for the (A)MVP candidate list construction process. In this case, motion vectors of the last k HMVP candidates within the HMVP table may be added next to the TMVP candidate constituting the MVP candidate list. In this case, for example, an HMVP candidate having the same reference picture as an MVP target reference picture may be used for constructing the MVP candidate list. Here, the MVP target reference picture may represent a reference picture for inter prediction of a current block to which the MVP mode has been applied. In this case, a pruning check may be applied to HMVP candidates. The k may be 4, for example. However, this particular value of k is a mere example, and k may assume various values such as 1, 2, 3, and 4.

Meanwhile, if the total number of merge candidates is equal to or larger than 15, a truncated unary plus fixed length (with 3 bits) binarization method may be applied for merge index coding as shown in Table 1 below.

TABLE 1

| merge index | Bin String | | | | | | | | | |
|---|---|---|---|---|---|---|---|---|---|---|
| 0 | 0 | | | | | | | | | |
| 1 | 1 | 0 | | | | | | | | |
| 2 | 1 | 1 | 0 | | | | | | | |
| ... | | | | | | | | | | |
| 5 | 1 | 1 | 1 | 1 | 1 | 0 | | | | |
| 6 | 1 | 1 | 1 | 1 | 1 | 1 | 0 | | | |
| 7 | 1 | 1 | 1 | 1 | 1 | 1 | 1 | 0 | 0 | 0 |
| 8 | 1 | 1 | 1 | 1 | 1 | 1 | 1 | 0 | 0 | 1 |
| ... | | | | | | | | | | |
| 14 | 1 | 1 | 1 | 1 | 1 | 1 | 1 | 1 | 1 | 1 |
| Bin index | 0 | 1 | 2 | 3 | 4 | 5 | 6 | 7 | 8 | 9 |

In the table above, it is assumed that $N_{mrg}$=15, and $N_{mrg}$ represents the total number of merge candidates.

Meanwhile, in developing a solution which employs video codec, for optimization of implementation, parallel processing may be supported for image/video coding.

Figure 11:
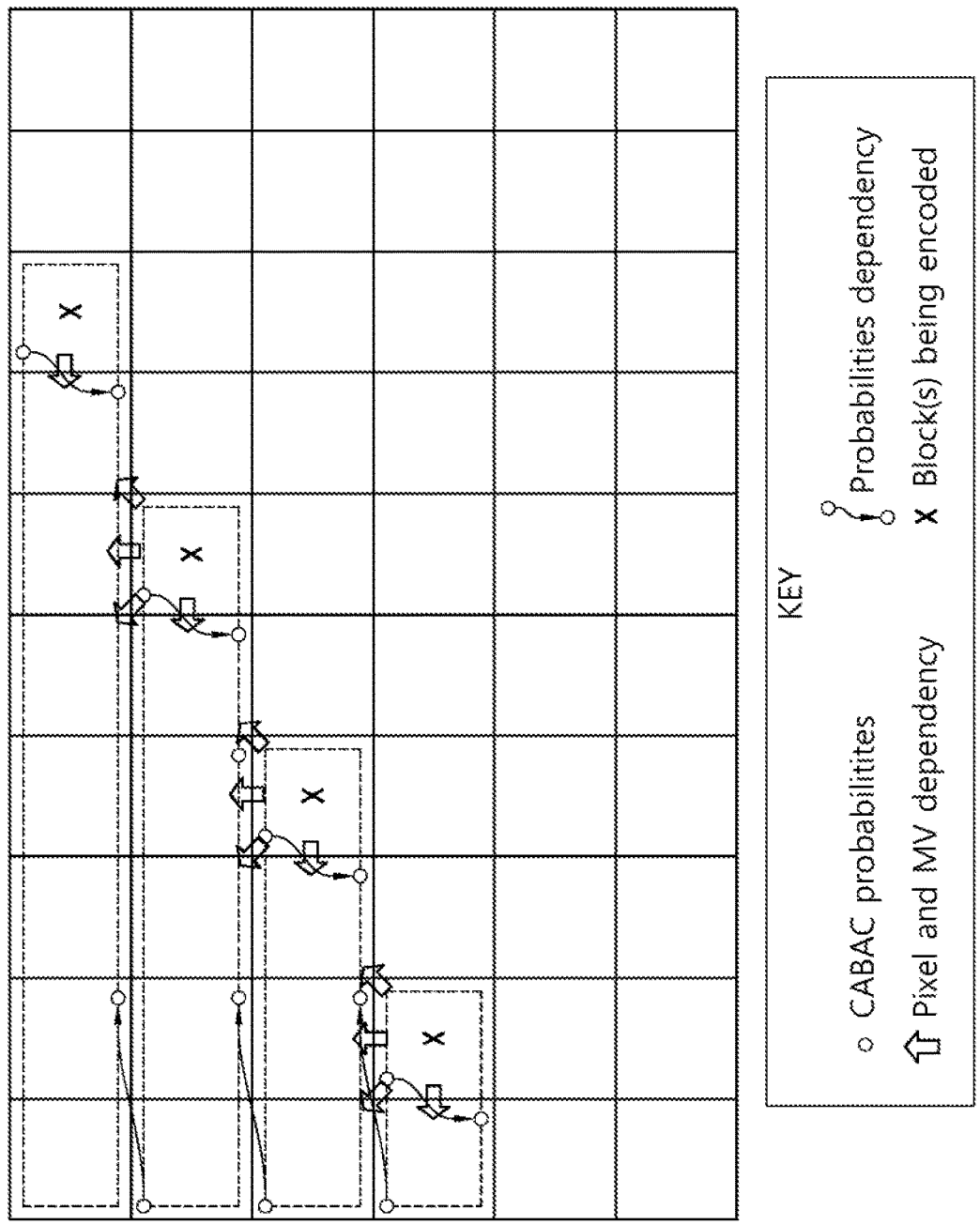
FIG. 11 illustrates Wavefront Parallel Processing (WPP), one of parallel processing techniques.

FIG. 11 illustrates Wavefront Parallel Processing (WPP), one of parallel processing techniques.

Referring to FIG. 11, if WPP is applied, parallel processing may be performed in units of CTU rows. In this case, if blocks marked by X are coded (encoding/decoding), dependency occurs at the position indicated by an arrow. Therefore, in order to code a current block marked by X, it has to wait for the CTU at its upper right position to be completed for coding. Also, if WPP is applied, initialization of a CABAC probability table (or context information) may be performed in units of slices, and the CABAC probability table (or context information) has to be initialized in units of CTU rows for parallel processing including entropy encoding/decoding. WPP may be regarded as a technique proposed for determining an efficient initialization position. If WPP is applied, each LCT row may be called a sub-stream, and parallel processing may be supported for a case where the coding apparatus is equipped with a plurality of processing cores. For example, if WPP is applied and three processing cores process decoding in parallel, the first processing core may decode sub-stream 0, the second processing core may decode sub-stream 1, and the third processing core may decode sub-stream 2. If WPP is applied, coding of the (n+1)-th (where n is an integer) sub-stream may be performed after coding of the n-th sub-stream is performed and coding of the second CTU or LCU of the n-th sub-stream are completed. For example, in the case of entropy coding, if entropy coding of the second LCU of the n-th sub-stream is completed, entropy coding of the first LCU of the (n+1)-th sub-stream may be performed based on context information about the second LCU of the n-th sub-stream. At this time, the number of sub-streams within a slice may be equal to the number of LCU rows. Also, the number of sub-streams within a slice may be equal to the number of entry points. At this time, the number of entry points may be specified by the number of entry point offsets. For example, the number of entry points may be larger than the number of entry point offsets plus one. Information about the number of entry point offsets and/or information about offset values may be encoded by being included in the video/image information or signaled to the decoding apparatus via a bitstream. Meanwhile, if the coding apparatus is equipped with one processing core, coding may be performed in a single sub-stream unit, through which a memory burden and coding dependency may be reduced.

The HMVP method stores motion information derived from the coding process of each block by as much as a predetermined buffer size (HMVP table). In this case, as disclosed in FIG. 9 without an additional condition, the HMVP table may be filled with as many candidates as the number of buffers or may be filled with candidates so that a newly added candidate is not overlapped with candidates already existing in the buffer (HMVP table) through a redundancy check. Through this operation, various candidates may be configured. However, when a solution employing video codec is developed, it is generally not possible to know at which time HMVP candidates fill the buffer. Therefore, it is impossible to implement parallel processing regardless of whether WPP is applied or not.

Figure 12:
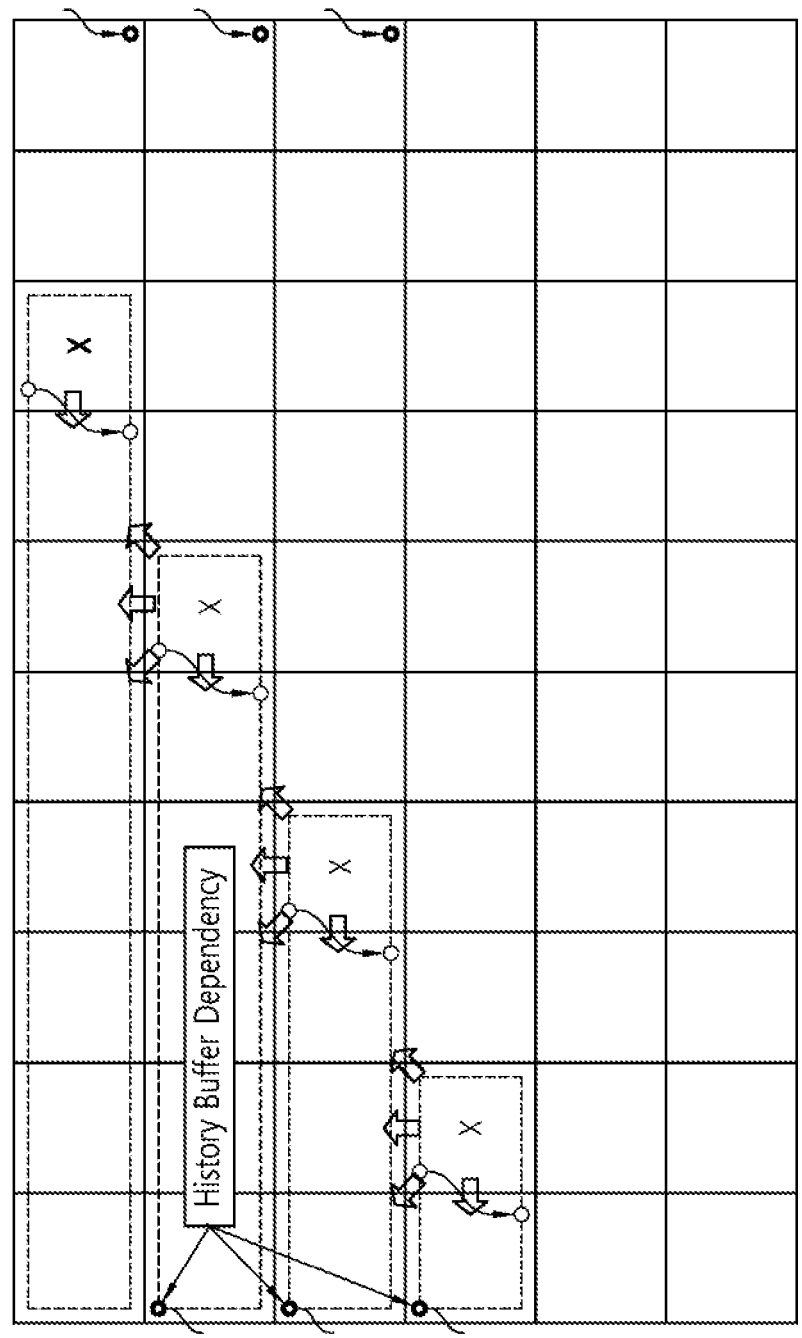
FIG. 12 illustrates a problem encountered when a general HMVP method is applied by taking into account parallel processing.

FIG. 12 illustrates a problem encountered when a general HMVP method is applied by taking into account parallel processing.

Referring to FIG. 12, if parallel processing is performed in units of CTU rows as in the WPP, a dependency problem occurs in the HMVP buffer. For example, an HMVP buffer for the firstly-ordered CTU in the N-th (N≥1) CTU row may be filled only after coding of blocks in the (N−1)-th CTU row, for example, blocks in the last CTU of the (N−1)-th CTU row is completed. In other words, in the current structure, if parallel processing is applied, the decoding apparatus is unable to know whether HMVP candidates stored in a current HMVP buffer are relevant to the HMVP buffer used for decoding of a current (target) block. This is so because an HMVP buffer derived at the time of coding of a current block through sequential processing may be different from an HMVP buffer derived at the time of coding of the current block through parallel processing.

In one embodiment of the present specification, to solve the problem above, parallel processing may be supported by initializing a history management buffer (HMVP buffer) when HMVP is applied.

Figure 13:
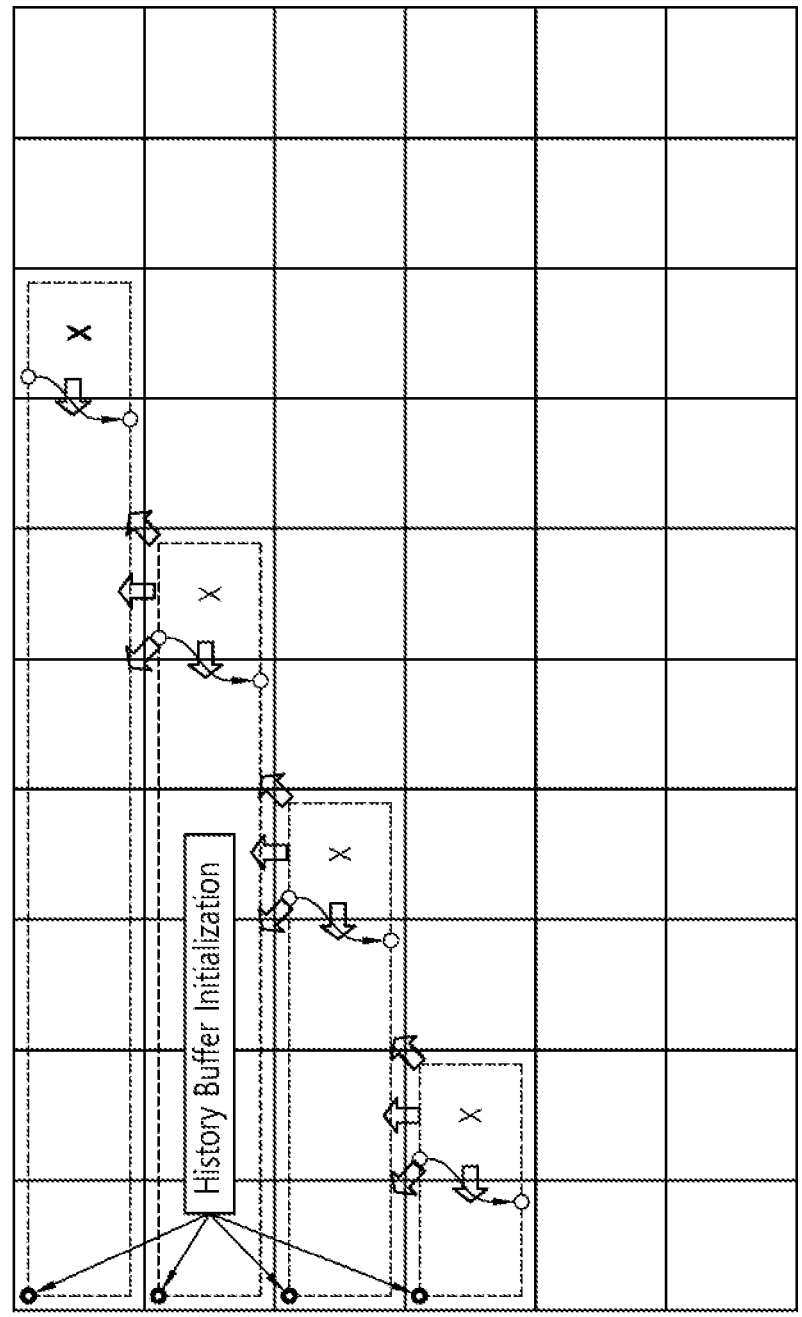
FIG. 13 illustrates a method for initializing a history management buffer (HMVP buffer) according to one embodiment of the present specification.

FIG. 13 illustrates a method for initializing a history management buffer (HMVP buffer) according to one embodiment of the present specification.

Referring to FIG. 13, an HMVP buffer may be initialized for every firstly-ordered CTU of a CTU row. In other words, if the firstly-ordered CTU of a CTU row is coded, an HMVP buffer may be initialized so that the number of HMVP candidates included in the HMVP buffer becomes 0. As described above, by initializing an HMVP buffer of each CTU row, HMVP candidates derived during the coding process of CTUs located in the left side of a current block may be used without a restriction even if parallel processing is supported. In this case, for example, if a current CU, which is the current block, is located at the firstly-ordered CTU of a CTU row, and the current CU corresponding to the first CU of the firstly-ordered CTU, the number of HMVP candidates included in the HMVP buffer is 0. Also, for example, if a CU coded before the current CU in the CTU row is coded in the inter mode, an HMVP candidate may be derived based on motion information of the previously coded CU and included in the HMVP buffer.

Figure 14:
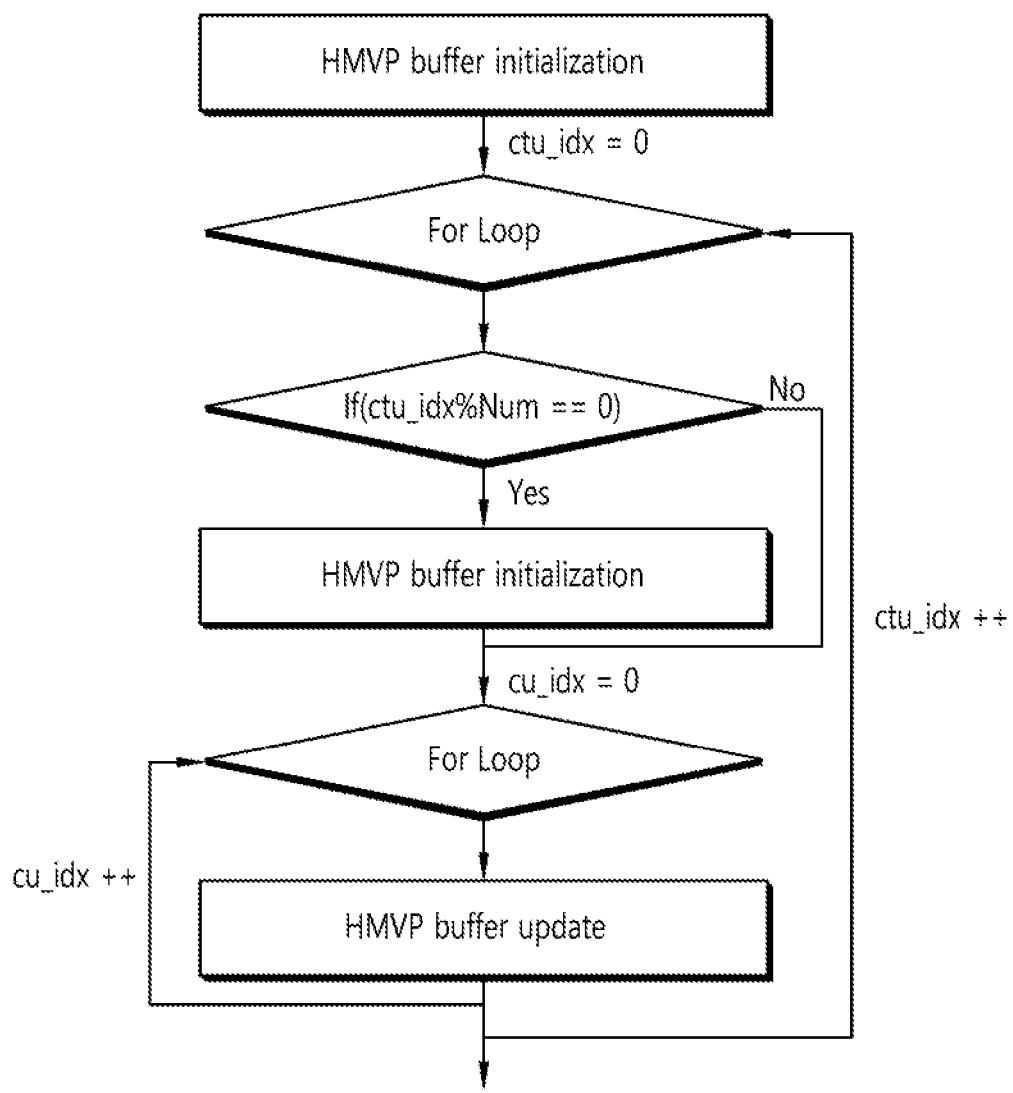
FIG. 14 illustrates an HMVP buffer management method according to one embodiment.

FIG. 14 illustrates an HMVP buffer management method according to one embodiment.

Referring to FIG. 14, an HMVP buffer may be initialized in slice units, and whether a target CTU (current CTU) for coding is the firstly-ordered CTU of each CTU row may be determined for CTUs within a slice. In FIG. 14, as an example, it is assumed that if (ctu_idx % Num) is 0, the target CTU is determined as the firstly-ordered CTU. At this time, Num represents the number of CTUs in each CTU row. As another example, if the aforementioned brick concept is employed, if (ctu_idx_in_brick % BrickWidth) is 0, it may be determined that the target CTU is the firstly-ordered CTU of a CTU row (within the corresponding brick). Here, ctu_idx_in_brick represents the index of the corresponding CTU within the brick, and BrickWdith represents the width of the corresponding brick in CTU units. In other words, BrickWidth may represents the number of CTU columns within the corresponding brick. If a current CTU is the firstly-ordered CTU of a CTU row, the HMVP buffer is initialized (namely, the number of candidates within the HMVP buffer is set to 0). Otherwise the HMVP buffer is retained. Afterwards, a prediction process (for example, a merge or MVP mode-based prediction process) is applied to each CU within the corresponding CTU, where a candidate stored in the HMVP buffer may be included as a motion information candidate in the merge or MVP mode (for example, a merge candidate or an MVP candidate). The motion information of a target block (current block) derived during the inter prediction process based on the merge or MVP mode is stored (updated) as a new HMVP candidate in the HMVP buffer. In this case, the redundancy check process described above may be further performed. Afterwards, the process described above may be applied repeatedly for subsequent CUs and CTUs.

As another example, dependency in CTU units may be removed by initializing the HMVP buffer for each CTU when HMVP is applied.

Figure 15:
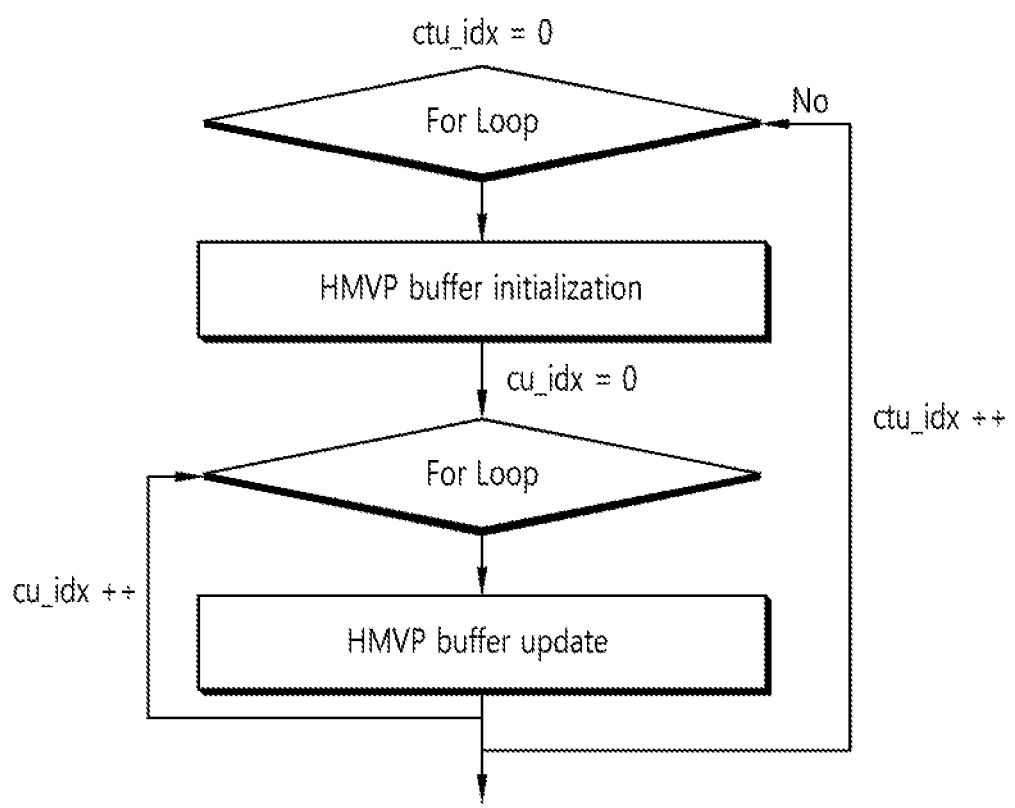
FIG. 15 illustrates an HMVP buffer management method according to another embodiment.

FIG. 15 illustrates an HMVP buffer management method according to another embodiment.

Referring to FIG. 15, HMVP buffer initialization may be performed for each CTU without involving determination of whether a current CTU is the firstly-ordered CTU of each CTU row. In this case, since an HMVP buffer is initialized in CTU units, motion information of blocks existing within a CTU is stored in the HMVP table. In this case, an HMVP candidate may be derived based on the motion information of blocks (for example, CUs) belonging to the same CTU, and HMVP buffer initialization is made possible without involving determination of whether the current CTU is the firstly-ordered CTU of each CTU row, as described below.

As described above, an HMVP buffer may be initialized in slice units, through which a motion vector of a block spatially separated from a current block is allowed to be used. In this case, however, since it is impossible to support parallel processing within a slice, the embodiments described above proposed a method for initializing a buffer in units of CTU rows or CTUs. In other words, according to embodiments of the present specification, an HMVP buffer may be initialized in slice units and may be initialized in CTU row units within a slice.

Meanwhile, one picture may be partitioned in slice units when the picture is coded (encoded/decoded) and/or the corresponding picture may be partitioned in tile units. For example, the corresponding picture may be partitioned in slice units by taking into account error resilience, or the corresponding picture may be partitioned in tile units to encode/decode part of regions within the corresponding picture. If an HMVP management buffer is applied when one picture is partitioned into multiple tiles, performing initialization in units of CTU rows within the corresponding picture, namely, initializing an HMVP buffer in the firstly-ordered CTU of each CTU row within the picture is not suitable for the tile structure in which only part of a picture is encoded/decoded.

Figure 16:
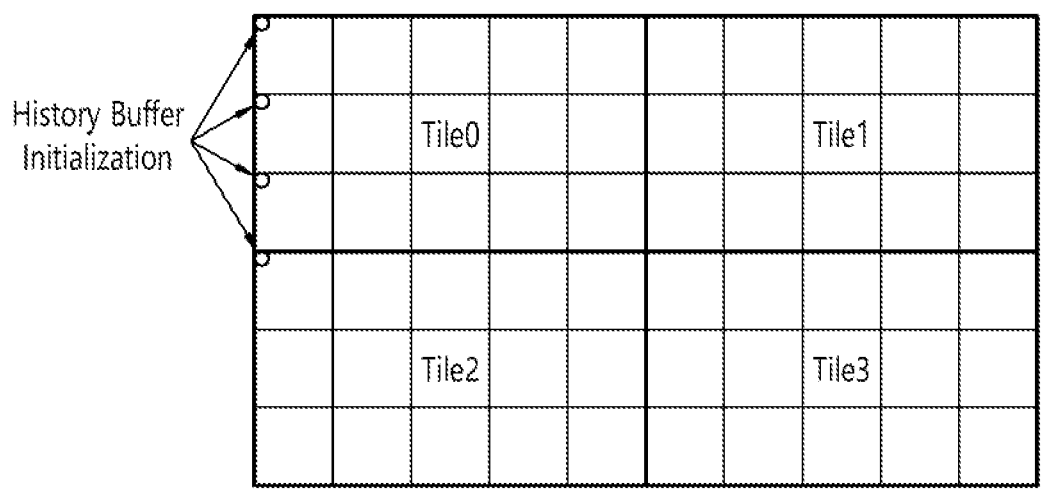
FIG. 16 illustrates a method for initializing an HMVP buffer in a tile structure.

FIG. 16 illustrates a method for initializing an HMVP buffer in a tile structure.

As shown in FIG. 16, since an HMVP management buffer is not initialized in tile units for the cases of tile 1 and 3, dependency on tile 0 and tile 2 occurs. Therefore, it is possible to initialize an HMVP buffer by using the following method in the existence of a tile.

As one example, an HMVP buffer may be initialized in CTU units. It is obvious that this initialization may be applied without distinguishing tiles and slices.

As another example, an HMVP buffer may be initialized with respect to the firstly-ordered CTU of each tile.

Figure 17:
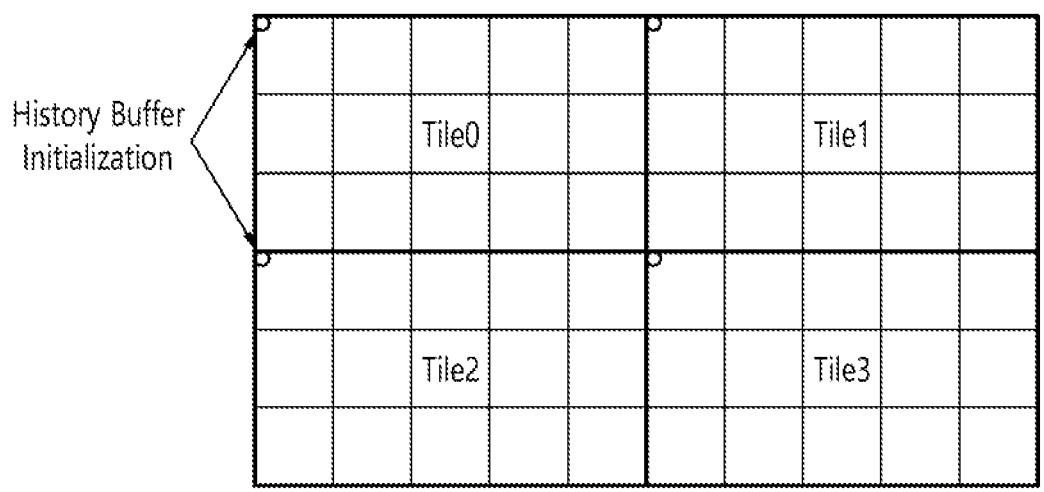
FIG. 17 illustrates an example of a method for initializing an HMVP buffer with respect to a firstly-ordered CTU of a tile according to another embodiment.

FIG. 17 illustrates an example of a method for initializing an HMVP buffer with respect to a firstly-ordered CTU of a tile according to another embodiment.

Referring to FIG. 17, in coding the firstly-ordered CTU of each tile, an HMVP buffer is initialized. In other words, when tile 0 is coded, the HMVP buffer 0 is initialized, and when tile 1 is coded, the HMVP buffer 1 is initialized.

As yet another example, an HMVP buffer may be initialized with respect to the firstly-ordered CTU of a CTU row within each tile.

Figure 18:
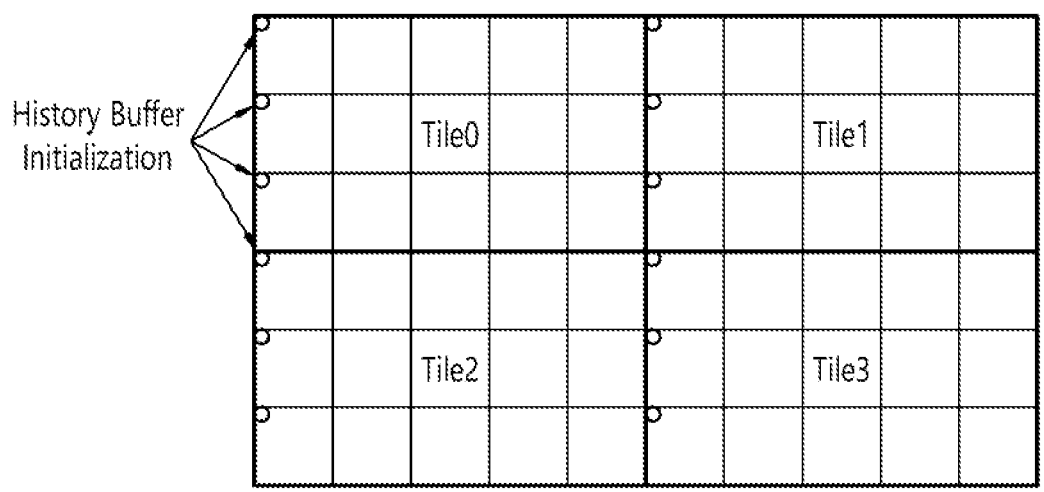
FIG. 18 illustrates an example of a method for initializing an HMVP management buffer with respect to a firstly-ordered CTU of a CTU row in each tile according to yet another embodiment.

FIG. 18 illustrates an example of a method for initializing an HMVP management buffer with respect to a firstly-ordered CTU of a CTU row in each tile according to yet another embodiment.

Referring to FIG. 18, an HMVP buffer may be initialized for each CTU row of each tile. For example, an HMVP buffer may be initialized in the firstly-ordered CTU of the firstly-ordered CTU row of tile n, an HMVP buffer is initialized in the firstly-ordered CTU of the second CTU row of tile n, and an HMVP buffer may be initialized in the firstly-ordered CTU of the third CTU row of tile n. In this case, if the coding apparatus is equipped with a multi-core processor, the HMVP buffer 0 for the firstly-ordered CTU row of tile n may be initialized to be used, HVMP buffer 1 for the second CTU row of tile n may be initialized to be used, and HMVP buffer 2 for the third CTU row of tile n may be initialized to be used, through which parallel processing may be supported. Meanwhile, if the coding apparatus is equipped with a single core processor, the coding apparatus may reuse an HVMP buffer by initializing the HVMP buffer in the firstly-ordered CTU of each CTU row within each tile according to a coding order.

Meanwhile, according to a tile partitioning structure and a slice partitioning structure, tiles and slices may exist simultaneously within one picture.

Figure 19:
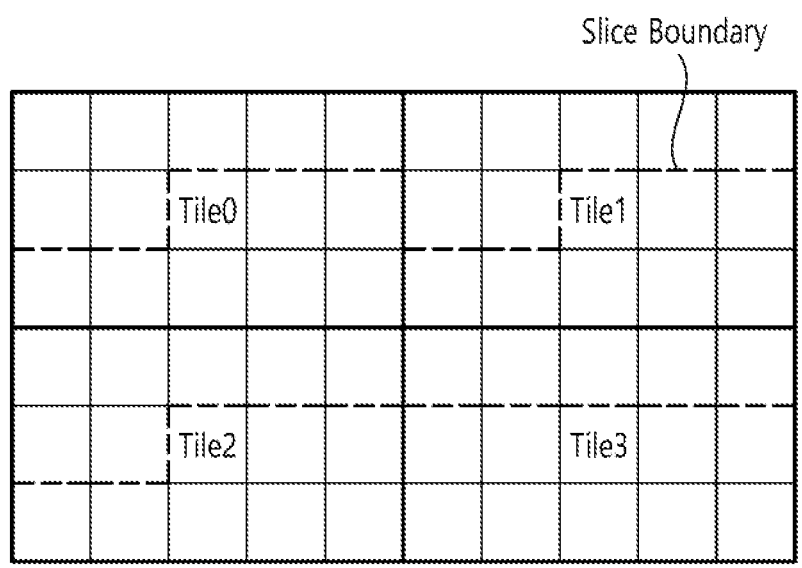
FIG. 19 illustrates an example of a structure in which tiles and slices exist together.

FIG. 19 illustrates an example of a structure in which tiles and slices exist together.

FIG. 19 illustrates a case where one picture is partitioned into four tiles, and each tile contains two slices. As shown in FIG. 19, both of a slice and a tile may exist together within one picture, and it is possible to initialize an HMVP buffer as follows.

As one example, an HMVP buffer may be initialized in CTU units. This method may be applied independently of whether a CTU is located in a tile or in a slice.

As another example, an HMVP buffer may be initialized with respect to the firstly-ordered CTU within each tile.

Figure 20:
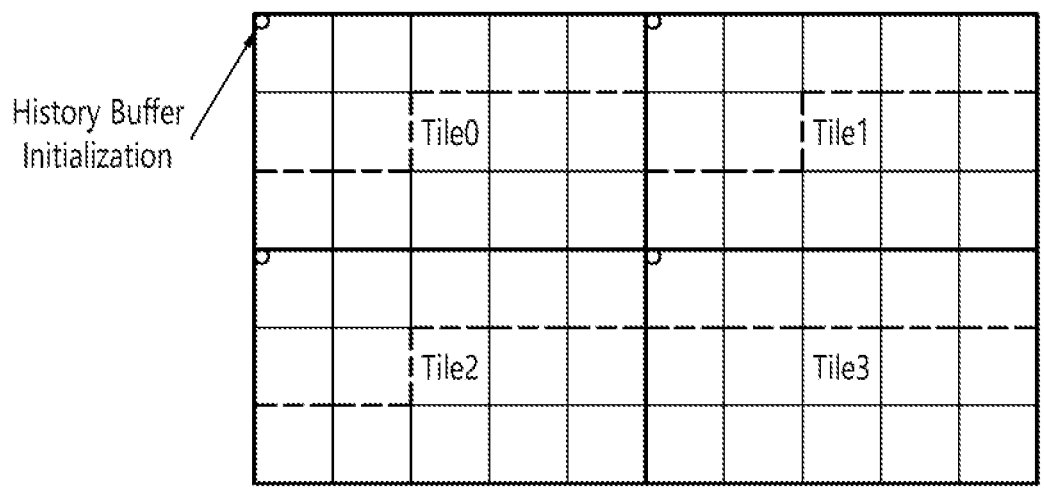
FIG. 20 illustrates an example of a method for initializing an HMVP buffer with respect to a firstly-ordered CTU within each tile.

FIG. 20 illustrates an example of a method for initializing an HMVP buffer with respect to a firstly-ordered CTU within each tile.

Referring to FIG. 20, an HMVP buffer may be initialized in the firstly-ordered CTU of each tile. Even if a plurality of slices exists within one tile, HMVP buffer initialization may be performed in the firstly-ordered CTU within the tile.

As yet another example, HMVP buffer initialization may be performed with respect to each slice existing within a tile.

Figure 21:
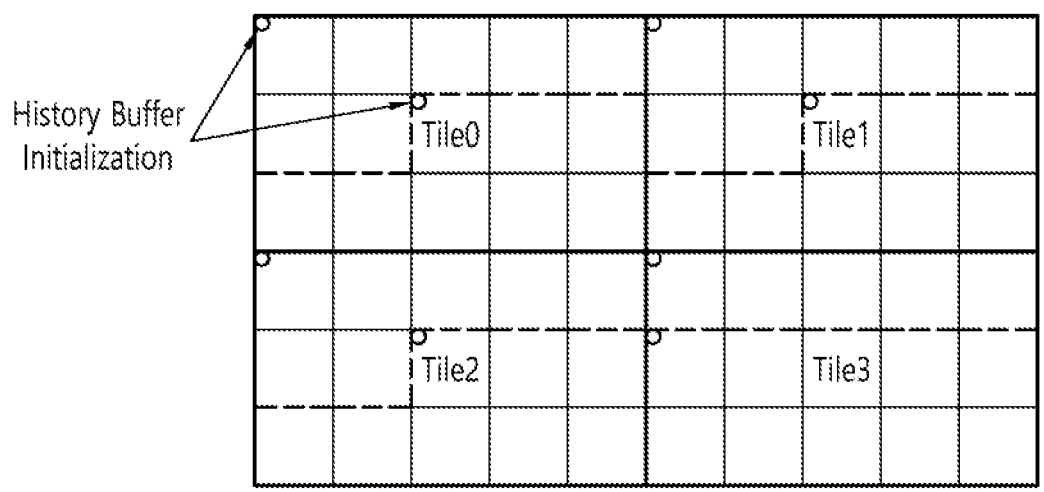
FIG. 21 illustrates an example of a method for initializing an HMVP buffer with respect to each slice within a tile.

FIG. 21 illustrates an example of a method for initializing an HMVP buffer with respect to each slice within a tile.

Referring to FIG. 21, an HMVP buffer may be initialized in the firstly-ordered CTU of each slice within a tile. Therefore, if a plurality of slices exists within one tile, HMVP buffer initialization may be performed for each of the plurality of slices. In this case, the HMVP buffer initialization may be performed when the firstly-ordered CTU of each slice is processed.

Meanwhile, a plurality of tiles may exist within one picture without slices. Or, a plurality of tiles may exist within one slice. In this case, HMVP buffer initialization may be performed as follows.

As one example, an HMVP buffer may be initialized for each tile group.

Figure 22:
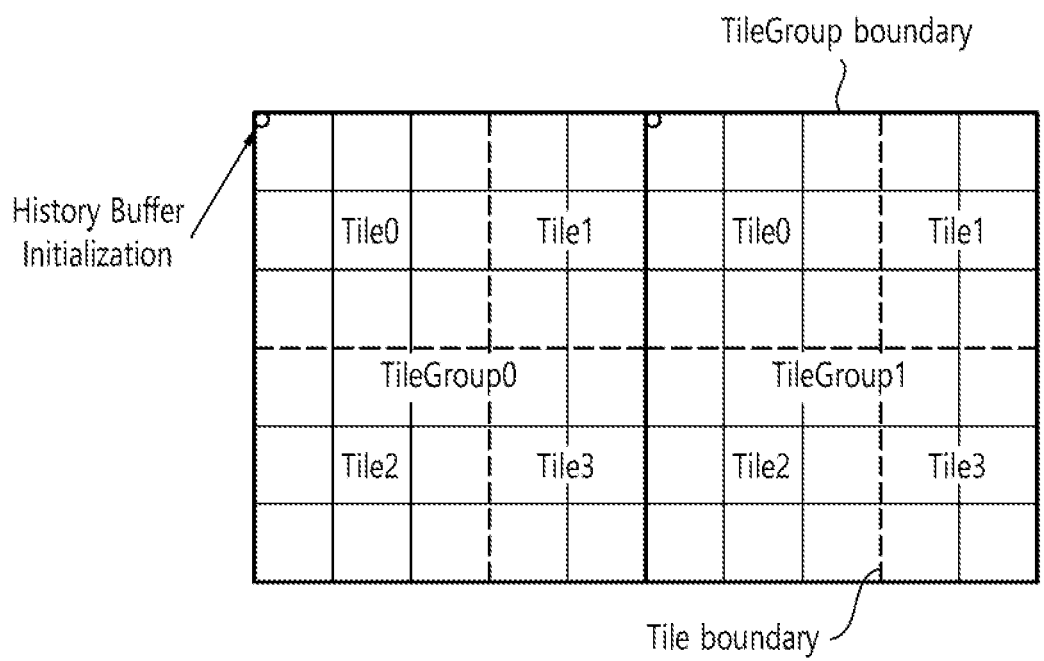
FIG. 22 illustrates an example of initializing an HMVP buffer with respect to a firstly-ordered CTU of a first tile within a tile group.

FIG. 22 illustrates an example of initializing an HMVP buffer with respect to a firstly-ordered CTU of a first tile within a tile group.

Referring to FIG. 22, one picture may be partitioned into two tile groups, and each tile group (TileGroup 0, TileGroup 1) may be partitioned into multiple tiles. In this case, an HMVP buffer may be initialized with respect to the firstly-ordered CTU of the first tile within one tile group.

As another example, an HMVP buffer may be initialized in tile units within a tile group.

Figure 23:
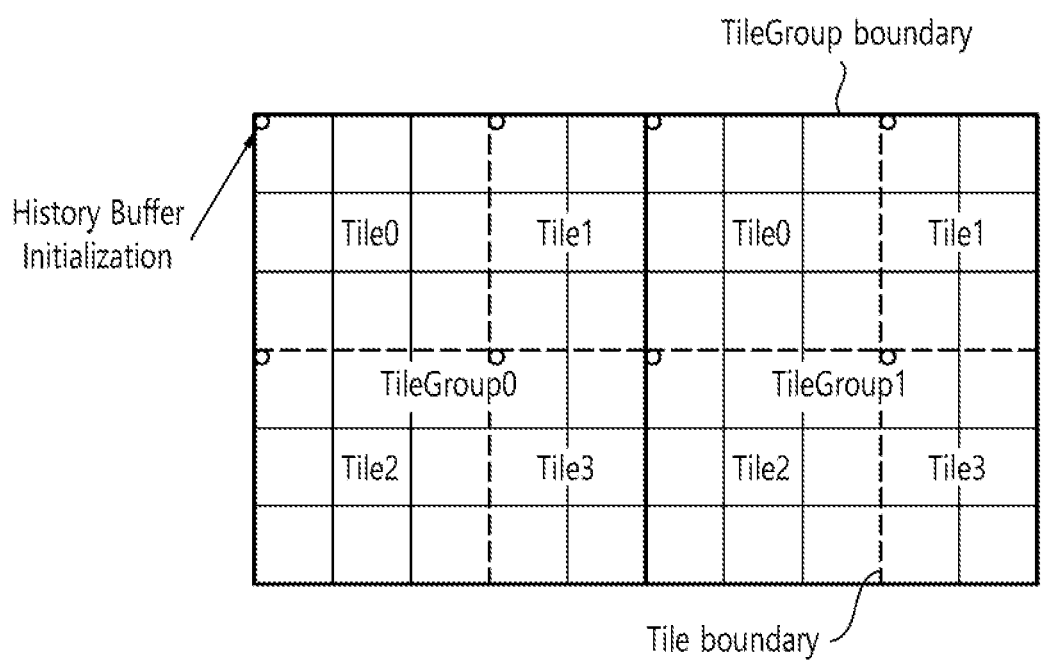
FIG. 23 illustrates an example of initializing an HMVP buffer with respect to a firstly-ordered CTU of each tile within a tile group.

FIG. 23 illustrates an example of initializing an HMVP buffer with respect to a firstly-ordered CTU of each tile within a tile group.

Referring to FIG. 23, one picture may be partitioned into two tile groups, and each tile group (TileGroup 0, TileGroup 1) may be partitioned into multiple tiles. In this case, an HMVP buffer may be initialized with respect to the firstly-ordered CTU of each tile within one tile group.

As yet another example, an HMVP buffer may be initialized with respect to a CTU row of each tile within a tile group.

Figure 24:
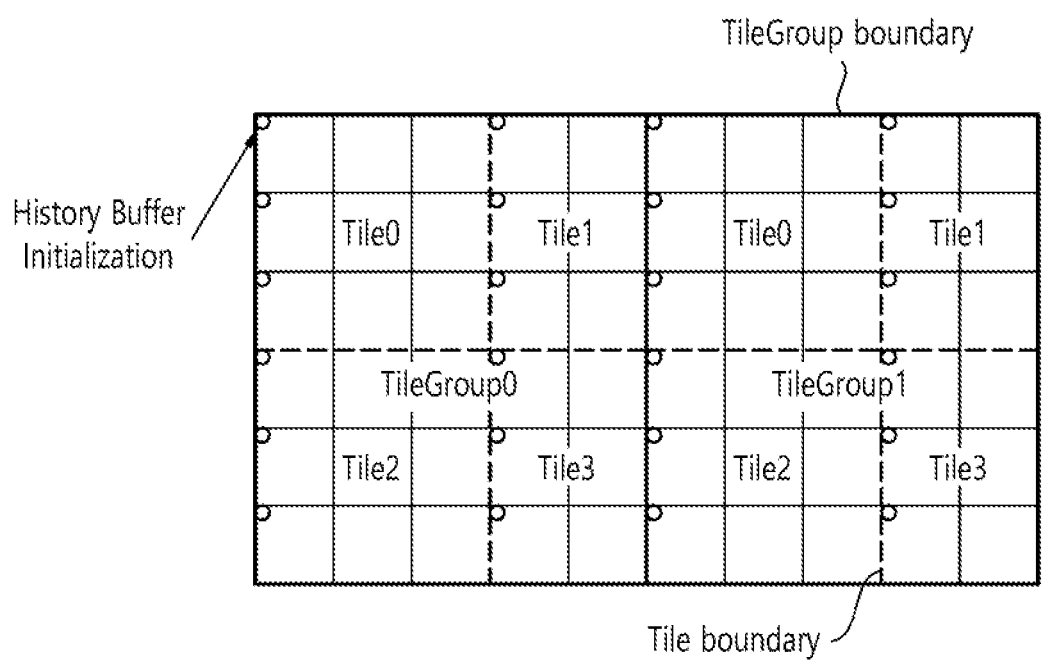
FIG. 24 illustrates an example of initializing an HMVP buffer with respect to a CTU row of each tile within a tile group.

FIG. 24 illustrates an example of initializing an HMVP buffer with respect to a CTU row of each tile within a tile group.

Referring to FIG. 24, one picture may be partitioned into two tile groups, and each tile group (TileGroup 0, TileGroup 1) may be partitioned into multiple tiles. In this case, an HMVP buffer may be initialized in the firstly-ordered CTU of a CTU row of each tile within one tile group.

Or, in this case, too, an HMVP management buffer may be initialized in CTU units. It is obvious that this initialization may be applied without distinguishing tiles and slices.

Meanwhile, a video/image coded according to the present specification may be processed according to a coding layer and structure described below.

Figure 25:
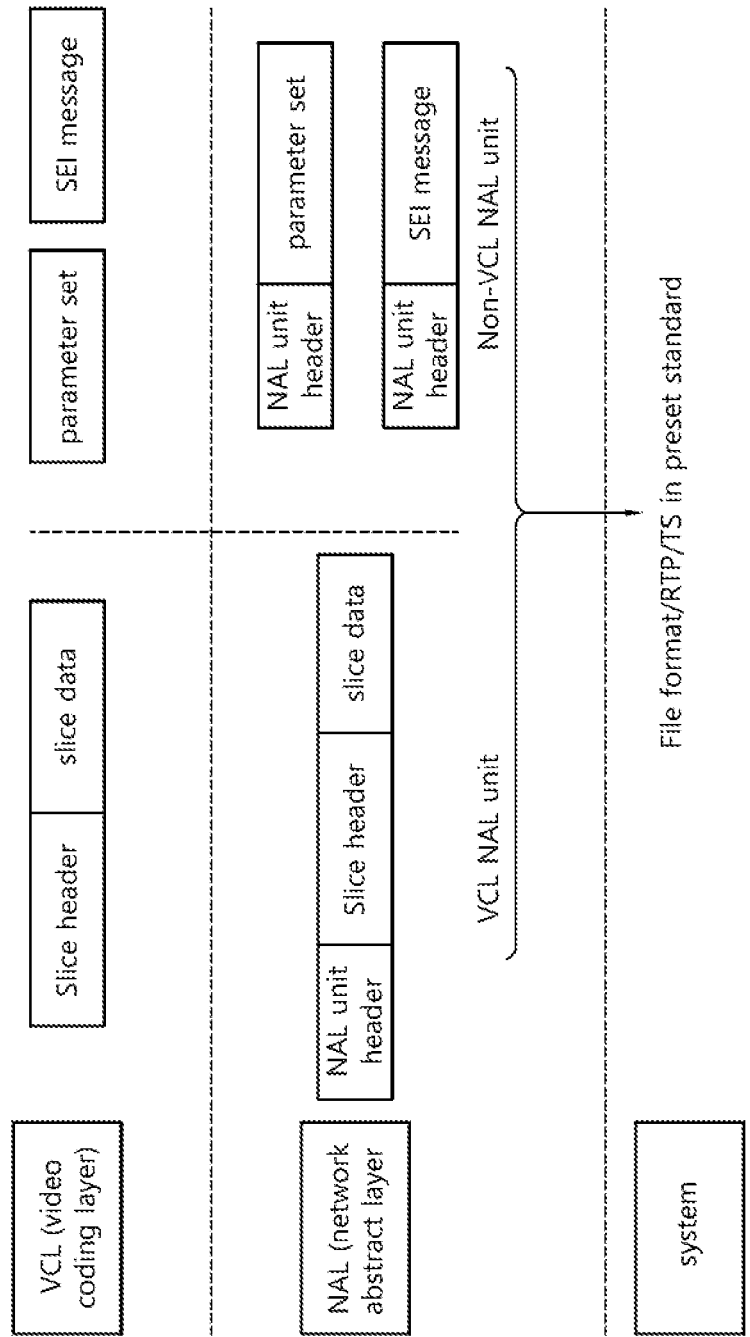
FIG. 25 illustrates a layer structure of a coded image/video.

FIG. 25 illustrates a layer structure of a coded image/video.

Referring to FIG. 25, a coded image/video comprises a video coding layer (VCL) dealing with decoding of an image/video and decoding itself, a sub-system transmitting and storing encoded information, and a network abstraction layer (NAL) located between the VCL and the sub-system and responsible for a network adaptation function.

In the VCL, VCL data including compressed image data (slice data) may be generated; or a parameter set including information such as a picture parameter set (PPS), sequence parameter set (SPS), and video parameter set (VPS) or a supplemental enhancement information (SEI) message required additionally for an image decoding process may be generated.

In the NAL, a NAL unit may be generated by adding header information (NAL unit header) to the Raw Byte Sequence Payload (RBSP) generated in the VCL. At this time, RBSP refers to the slice data, parameter set, and SEI message generated in the VCL. The NAL unit header may include NAL unit type information specified according to the RBSP data included in the corresponding NAL unit.

As shown in the figure, the NAL unit may be divided into a VCL NAL unit and a Non-VCL NAL unit according to the RBSP generated in the VCL. The VCL NAL unit may refer to the NAL unit including information (slice data) about an image, and the Non-VCL NAL unit may refer to the NAL unit including information (parameter set or SEI message) required for decoding an image.

The aforementioned VCL NAL unit and Non-VCL NAL unit may be transmitted through a network by attaching header information according to data specifications of the sub-system. For example, the NAL unit may be modified into data types of predetermined specifications such as H.266/VVC file format, Real-time Transport Protocol (RTP), or Transport Stream (TS) and transmitted through various types of networks.

As described above, NAL unit type of the NAL unit may be specified according to the RBSP data structure included in the corresponding NAL unit, and information about the NAL unit type may be stored in the NAL unit header and signaled as such.

For example, according to whether the NAL unit includes information about an image (slice data), the NAL unit may be largely divided into VCL NAL unit type and Non-VCL NAL unit type. The VCL NAL unit type may be classified according to characteristics and type of a picture included in the VCL NAL unit, and the Non-VCL NAL unit type may be classified according to the type of the parameter set.

In what follows, provided is one example of a NAL unit type specified according to the type of the parameter set included in the Non-VCL NAL unit type.

Adaptation Parameter Set (APS) NAL unit: type of NAL unit including APS

Decoding Parameter Set (DPS) NAL unit: type of NAL unit including DPS

Video Parameter Set (VPS) NAL unit: type of NAL unit including VPS

Sequence Parameter Set (SPS) NAL unit: type of NAL unit including SPS

Picture Parameter Set (PPS) NAL unit: type of NAL unit including PPS

The NAL unit types include syntax information for NAL unit type, and the syntax information may be stored in the NAL unit header and signaled as such. For example, the syntax information may be nal_unit_type, and NAL unit types may be specified by the value of nal_unit_type.

The slice header (slice header syntax) may include information/parameter that may be applied commonly to the slice. The APS (APS syntax) or PPS (PPS syntax) may include information/parameter that may be applied commonly applied to one or more slices or pictures. The SPS (SPS syntax) may include information/parameter that may be applied commonly to one or more sequences. The VPS (VPS syntax) may include information/parameter that may be applied commonly multiple layers. The DPS (DPS syntax) may include information/parameter that may be commonly applied to the whole video. The DPS may include information/parameter related to concatenation of coded video sequences (CVSs). High level syntax (HLS) in the present specification may include at least one of the APS syntax, PPS syntax, SPS syntax, VPS syntax, DPS syntax, and slice header syntax.

In the present specification, image/video information encoded and signaled in the form of a bitstream from the encoding apparatus to the decoding apparatus may include not only information related to in-picture partitioning, intra/inter prediction information, residual information, in-loop filtering information but also information included in the slice header, information included in the APS, information included in the PPS, information included in the SPS and/or information included in the VPS.

Meanwhile, as described above, if an HMVP buffer (HMVP candidate set) is initialized in slice units or in units of CTU rows within a slice, related syntax may be expressed as follows.

TABLE 2

| | Descriptor |
|---|---|
| slice_data( ) {<br>  do {<br>    if(slice type != I)<br>      HMVPCandNum = 0<br>    coding tree unit( )<br>    end_of_slice_ flag<br>    CtbAddrInRs++<br>  } while( !end_of_slice_flag )<br>} | <br><br><br><br><br>ae(v) |

TABLE 3

| | Descriptor |
|---|---|
| slice_data( ) {<br>  do {<br>    if ((slice_type ! = I) && ((CtbAddrInRs %<br>PicWidthInCtbsY == 0) \|\| (CtbAddrInRs == slice_address)))<br>      HMVPCandNum = 0<br>    coding_tree_unit( )<br>    end_of_slice_flag<br>    CtbAddrInRs++<br>  } while( !end_of_slice_flag )<br>} | <br><br><br><br><br><br>ae(v) |

Table 2 shows an example of initializing an HMVP buffer in slice units, and Table 3 shows an example of initializing an HMVP buffer in units of CTUs within a slice. A slice may include a plurality of CTUs within a picture in the spatial domain. Also, a slice may comprise a slice header that carries header information in the video coding layer (VCL) and slice data that carries compressed image data. Here, slice_type may represent a syntax element indicating coding type of a slice. The slice_type may be derived as I slice, B slice, or P slice based on the slice_type.

For example, as shown in Table 2, a plurality of CTUs may be included within a slice, and when slice data syntax related to the slice is decoded, the HMVP buffer may be initialized. In this case, the number of HMVP candidates (for example, HMVPcandNum) may be set to 0.

Also, for example, as shown in Table 3, a plurality of CTUs may be included in a slice, and CTUs may be coded (encoded/decoded) sequentially. If the corresponding CTU corresponds to the firstly-ordered CTU of a CTU row within a picture (for example, CtbAddrInRs % PicWidthInCtbsY==0) or if the corresponding CTU corresponds to the firstly-ordered CTU within a slice (for example, CtbAddrInRs==slice_address), an HMVP buffer may be initialized in the corresponding CTU. In this case, the number of HMVP candidates (for example, HMVPcandNum) may be set to 0.

Figure 26:
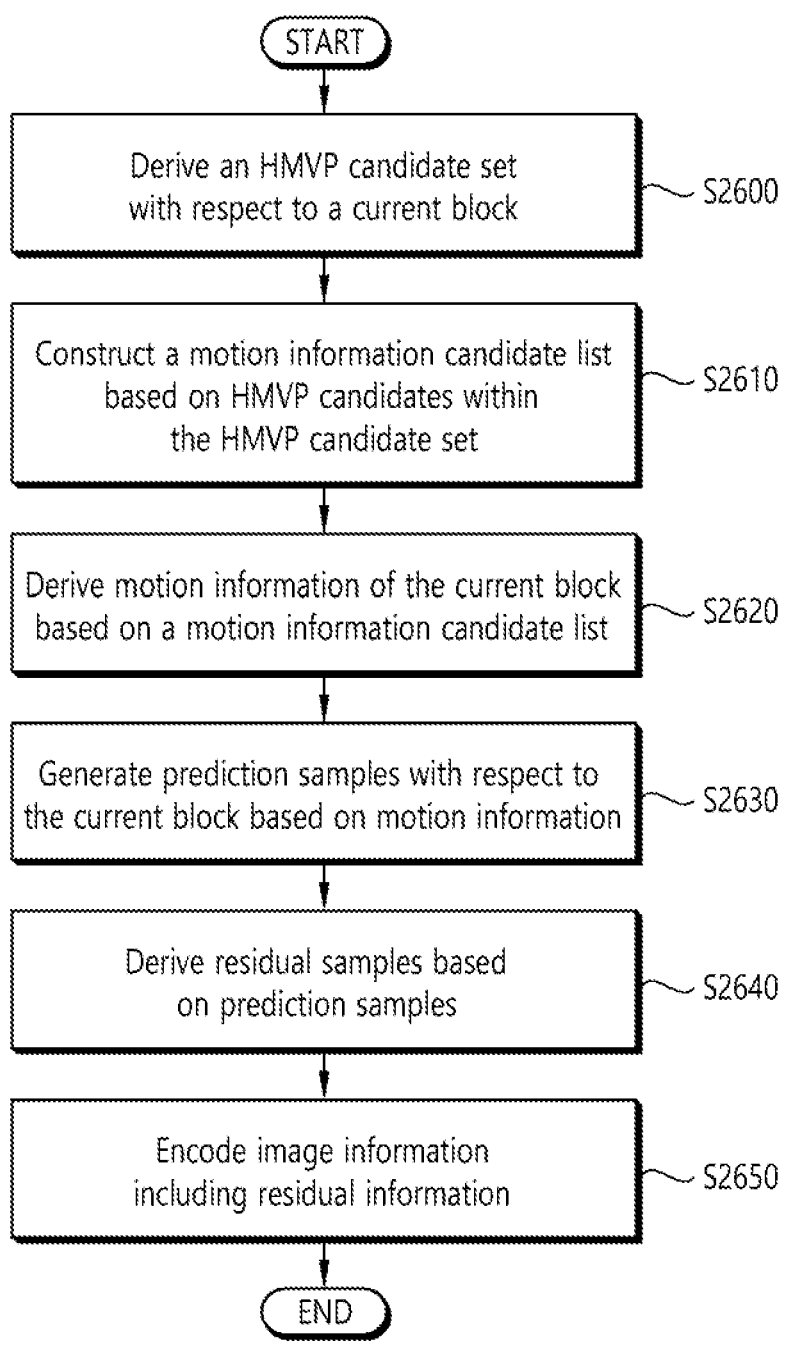
FIGS. 26 and 27 illustrate one example of a video/image encoding method including an inter prediction method and related components according to an embodiment(s) of the present specification.
Figure 27:
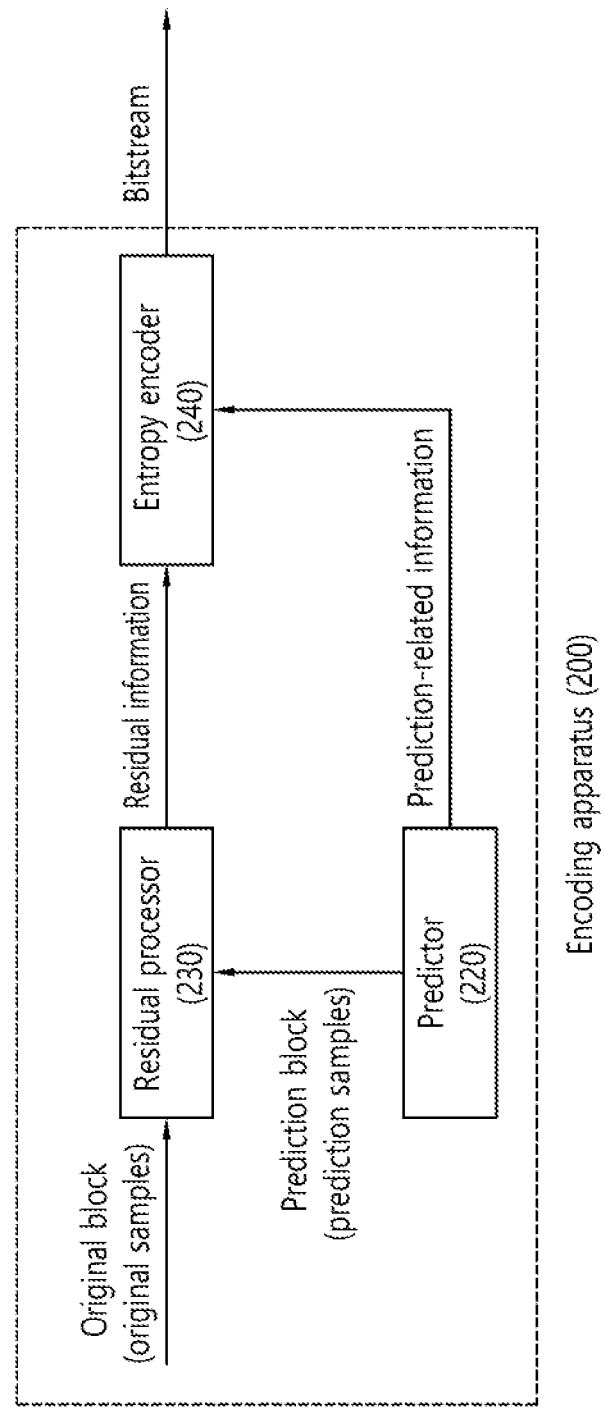

FIGS. 26 and 27 illustrate one example of a video/image encoding method including an inter prediction method and related components according to an embodiment(s) of the present specification. The method disclosed in FIG. 26 may be performed by the encoding apparatus disclosed in FIG. 2. More specifically, for example, S2600 to S2630 of FIG. 26 may be performed by the predictor 220 of the encoding apparatus, and S2640 of FIG. 26 may be performed by the residual processor 230 of the encoding apparatus, and S2650 of FIG. 26 may be performed by the entropy encoder 240 of the encoding apparatus. The method disclosed in FIG. 26 may include embodiments described in the present specification.

Referring to FIG. 26, the encoding apparatus derives an HMVP candidate set with respect to a current block S2600. The encoding apparatus may perform the HMVP candidate set management method (or HMVP buffer management method) described in the embodiments of the present specification. For example, the MVP candidate set may be updated based on the motion information of a previous block. Here, the previous block may indicate a block coded/processed earlier within a CTU row, in a current picture, a current tile, or a current slice, in which the current block is located. Also, for example, the HMVP candidate set may be initialized in a specific CTU among CTUs of the CTU row including the current block. More specifically, for example, the specific CTU may be the firstly-ordered CTU among CTUs of the CTU row within a current picture or the firstly-ordered CTU among CTUs of the CTU row within a current tile (or firstly-ordered CTU within a current slice). Also, more specifically, for example, the HMVP candidate set may be initialized in slice, tile, or tile group units. And/or the HMVP candidate set may be initialized in units of CTU rows. The HMVP candidate set may be initialized per CTU row in each slice, tile or tile group. The tile may be represented as a rectangular region of CTUs within a picture. The tile may be specified based on a specific tile row and specific a tile column within the picture. For example, one or more tiles may be present within a current picture. In this case, The HMVP candidate set may be initialized at a firstly-ordered CTU of a CTU row including the current block within a current tile. Or, one or more slices may be present within the current picture. In this case, The HMVP candidate set may be initialized at a firstly-ordered CTU of a CTU row including the current block within a current slice.

Or, one or more tile groups may be present within the current picture. In this case, The HMVP candidate set may be initialized at a firstly-ordered CTU of a CTU row including the current block within a current tile group. The encoding apparatus may determine whether the current CTU is the firstly-ordered CTU of the CTU row. In this case, the HMVP candidate set may be initialized in the firstly-ordered CTU of a CTU row in which the current CTU including the current block is located. In other words, the HMVP candidate set may be initialized if the firstly-ordered CTU of a CTU row in which the current CTU including the current block is processed. If the current CTU is determined to be the firstly-ordered CTU of the CTU row within the current tile, the HMVP candidate set may include an HMVP candidate derived based on the motion information of a block processed earlier than the current block within the current CTU. If it is determined that the current CTU is not the firstly-ordered CTU of the CTU row within the current tile, the HMVP candidate set may include a first HMVP candidate derived based on motion information of a block processed earlier than the current block within the current CTU and a second HMVP candidate derived based on motion information of a block processed earlier within a previous CTU of the current CTU of the CTU row within the current tile. Also, for example, if the current CU, which is a current block, is located in the firstly-ordered CTU of the CTU row, and the current CU corresponds to the first CU of the firstly-ordered CTU, the number of HMVP candidates included in the HMVP candidate set is 0. Also, for example, if a CU coded earlier than the current CU in the CTU row (for example, a CU coded earlier than the current CU in the current CTU and/or a CU within a CTU coded earlier than the current CTU in the current CTU row) is coded in the inter mode, an HMVP candidate may be derived based on the motion information of the CU coded earlier and included in the HMVP candidate set.

If the current picture is divided into a plurality of tiles, the HMVP buffer is initialized per each CTU row in each tile.

The HMVP candidate set may be initialized in units of CTU rows within a tile or a slice. For example, if a specific CTU of the CTU row is not the firstly-ordered CTU of the CTU row within a current picture but the specific CTU is the firstly-ordered CTU within a current tile or a current slice, the HMVP candidate set may be initialized at the specific CTU.

If the HMVP candidate set is initialized, the number of HMVP candidates included in the HMVP candidate set may be set to 0.

The encoding apparatus constructs a motion information candidate list based on the HMVP candidate set S2610. The HMVP candidate set may include an HMVP candidate, and the motion information candidate list including the HMVP candidate may be constructed.

As one example, if merge mode is applied to the current block, the motion information candidate list may be a merge candidate list. As another example, if (A)MVP mode is applied to the current block, the motion information candidate list may be an MVP candidate list. If merge mode is applied to the current block, the HMVP candidate may be added to the merge candidate list if the number of available merge candidates (for example, including spatial merge candidates and temporal merge candidate) within the merge candidate list with respect to the current block is smaller than the maximum number of merge candidates. In this case, the HMVP candidate may be inserted to the back of the spatial and temporal candidates within the merge candidate list. In other words, an index larger than the indexes assigned to the spatial and temporal candidates within the merge candidate list may be assigned to the HMVP candidate. If (A)MVP mode is applied to the current block, the HMVP candidate may be added to the MVP candidate list if the number of available MVP candidates (derived based on spatial neighboring blocks and temporal neighboring blocks) within the MVP candidate list with respect to the current block is smaller than 2.

The encoding apparatus may derive motion information of the current block based on the motion information candidate list S2620.

The encoding apparatus may derive motion information of the current block based on the motion information candidate list. For example, if merge mode or MVP mode is applied to the current block, the HMVP candidate belonging to the HMVP candidate set may be used as a merge candidate or MVP candidate. For example, if merge mode is applied to the current block, the HMVP candidate belonging to the HMVP candidate set is included as a candidate of a merge candidate list, and the HMVP candidate may be indicated based on a merge index among candidates belonging to the merge candidate list. The merge index may be included in the image/video information described later as prediction-related information. In this case, an index may be assigned to the HMVP candidate within the merge candidate list with priority lower than spatial merge candidates and temporal merge candidate belonging to the merge candidate list. In other words, the index whose value is higher than the index values of the spatial merge candidates and temporal merge candidate may be assigned to the HMVP candidate. As another example, if MVP mode is applied to the current block, the HMVP candidate belonging to the HMVP candidate set may be included as a candidate of the merge candidate list, and the HMVP candidate may be indicated among candidates belonging to the MVP candidate list based on an MVP flag (or MVP index). The MVP flag (or MVP index) may be included in the image/video information described later as prediction-related information.

The encoding apparatus generates prediction samples with respect to the current block based on the derived motion information S2630. The encoding apparatus may perform inter prediction (motion compensation) based on the motion information and derive prediction samples by using reference samples indicated by the motion information on a reference picture.

The encoding apparatus generates residual samples based on the prediction samples S2640. The encoding apparatus may generate residual samples based on original samples with respect to the current block and prediction samples with respect to the current block.

The encoding apparatus derives information about residual samples based on the residual samples and encodes image/video information including information about the residual samples S2650. The information about residual samples may be referred to as residual information, which may include information about quantized transform coefficients. The encoding apparatus may perform a transform/quantization process on the residual samples and derive quantized transform coefficients.

The encoded image/video information may be output in the form of a bitstream. The bitstream may be transmitted to the decoding apparatus via a network or a storage medium. The image/video information may further include prediction-related information, and the prediction-related information may further include information about various prediction modes (for example, merge mode or MVP mode) and MVD information.

The encoded image information may include slice data syntax. The slice data syntax may include a filed about one or more CTUs within a slice, and the information indicating the specific CTU in which the HMVP candidate set is initialized may be included in the slice data syntax.

Figure 28:
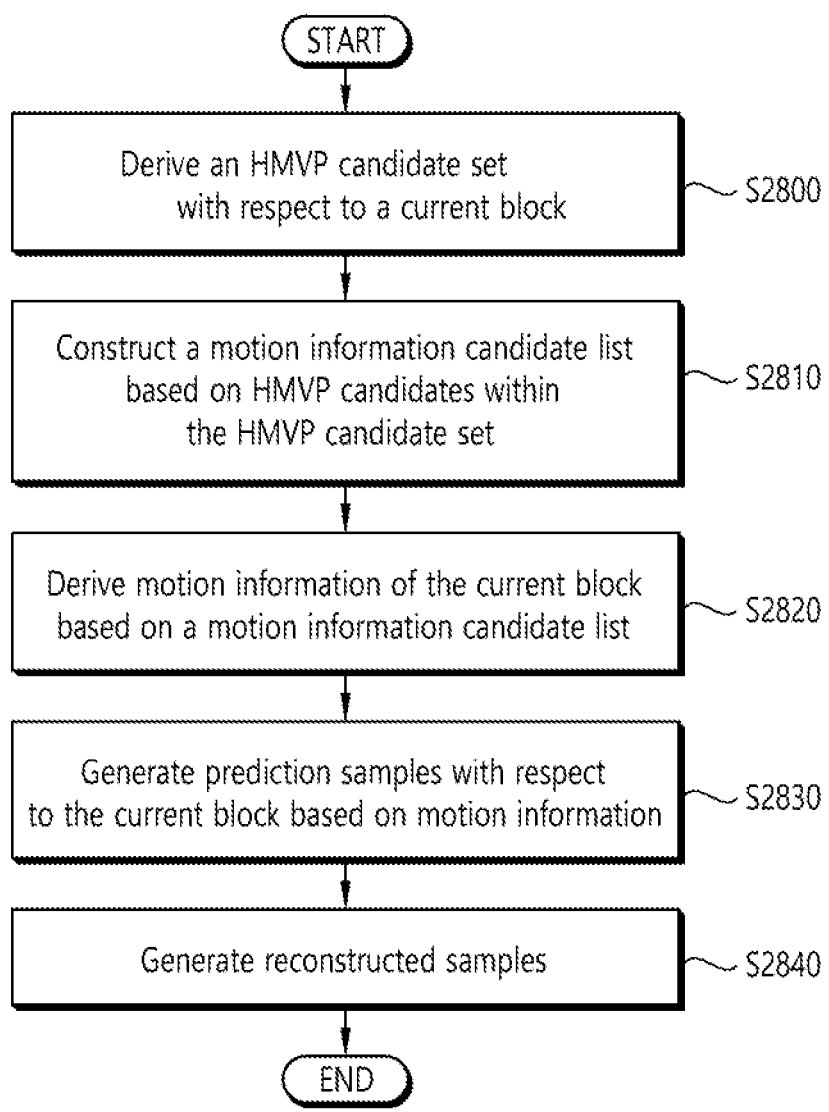
FIGS. 28 and 29 illustrate one example of an image decoding method including an inter prediction method and related components according to an embodiment of the present specification.
Figure 29:
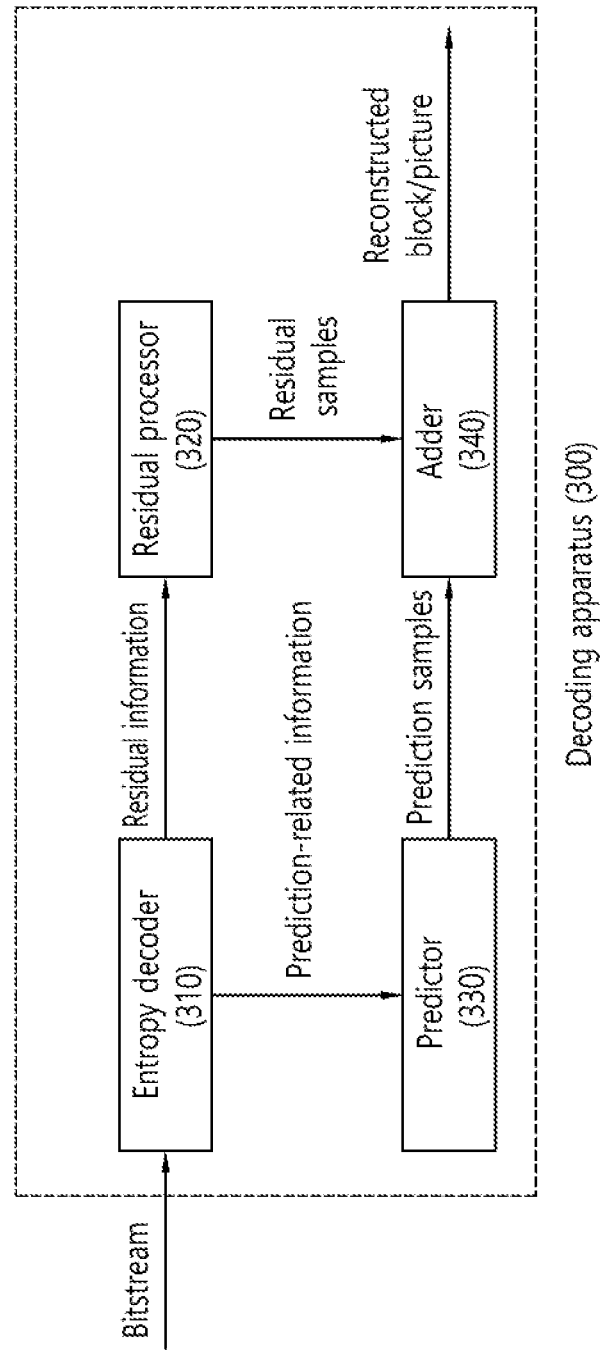

FIGS. 28 and 29 illustrate one example of an image decoding method including an inter prediction method and related components according to an embodiment of the present specification. The method disclosed in FIG. 28 may be performed by the decoding apparatus disclosed in FIG. 3. More specifically, for example, S2800 to S2830 of FIG. 28 may be performed by the predictor 330 of the decoding apparatus, and S2840 may be performed by the adder 340 of the decoding apparatus. The method disclosed in FIG. 28 may include embodiments described in the present specification.

Referring to FIG. 28, the decoding apparatus derives an HMVP candidate set with respect to a current block S2800. The decoding apparatus may perform the HMVP candidate set management method (or HMVP buffer management method) described in the embodiments of the present specification. For example, the MVP candidate set may be updated based on the motion information of a previous block. Here, the previous block may indicate a block coded/processed earlier within a CTU row, in a current picture, a current tile, or a current slice, in which the current block is located. Also, for example, the HMVP candidate set may be initialized in a specific CTU among CTUs of the CTU row including the current block. More specifically, for example, the specific CTU may be the firstly-ordered CTU among CTUs of the CTU row within a current picture or the firstly-ordered CTU among CTUs of the CTU row within a current tile (or firstly-ordered CTU within a current slice). Also, more specifically, for example, the HMVP candidate set may be initialized in slice, tile, or tile group units. And/or the HMVP candidate set may be initialized in units of CTU rows. The HMVP candidate set may be initialized per CTU row in each slice, tile or tile group. The tile may be represented as a rectangular region of CTUs within a picture. The tile may be specified based on a specific tile row and specific a tile column within the picture. For example, one or more tiles may be present within a current picture. In this case, The HMVP candidate set may be initialized at a firstly-ordered CTU of a CTU row including the current block within a current tile. Or, one or more slices may be present within the current picture. In this case, The HMVP candidate set may be initialized at a firstly-ordered CTU of a CTU row including the current block within a current slice. Or, one or more tile groups may be present within the current picture. In this case, The HMVP candidate set may be initialized at a firstly-ordered CTU of a CTU row including the current block within a current tile group. The decoding apparatus may determine whether the current CTU is the firstly-ordered CTU of the CTU row. In this case, the HMVP candidate set may be initialized in the firstly-ordered CTU of a CTU row in which the current CTU including the current block is located. In other words, the HMVP candidate set may be initialized if the firstly-ordered CTU of a CTU row in which the current CTU including the current block is processed. If the current CTU is determined to be the firstly-ordered CTU of the CTU row within the current tile, the HMVP candidate set may include an HMVP candidate derived based on the motion information of a block processed earlier than the current block within the current CTU. If it is determined that the current CTU is not the firstly-ordered CTU of the CTU row within the current tile, the HMVP candidate set may include a first HMVP candidate derived based on motion information of a block processed earlier than the current block within the current CTU and a second HMVP candidate derived based on motion information of a block processed earlier within a previous CTU of the current CTU of the CTU row within the current tile. Also, for example, if the current CU, which is a current block, is located in the firstly-ordered CTU of the CTU row, and the current CU corresponds to the first CU of the firstly-ordered CTU, the number of HMVP candidates included in the HMVP candidate set is 0. Also, for example, if a CU coded earlier than the current CU in the CTU row (for example, a CU coded earlier than the current CU in the current CTU and/or a CU within a CTU coded earlier than the current CTU in the current CTU row) is coded in the inter mode, an HMVP candidate may be derived based on the motion information of the CU coded earlier and included in the HMVP candidate set.

If the current picture is divided into a plurality of tiles, the HMVP buffer is initialized per each CTU row in each tile.

The HMVP candidate set may be initialized in units of CTU rows within a tile or a slice. For example, if a specific CTU of the CTU row is not the firstly-ordered CTU of the CTU row within a current picture but the specific CTU is the firstly-ordered CTU within a current tile or a current slice, the HMVP candidate set may be initialized at the specific CTU.

If the HMVP candidate set is initialized, the number of HMVP candidates included in the HMVP candidate set may be set to 0.

The slice data syntax may include a filed about one or more CTUs within a slice, and the information indicating the specific CTU in which the HMVP candidate set is initialized may be included in the slice data syntax.

The decoding apparatus constructs a motion information candidate list based on the HMVP candidate set S2810. The HMVP candidate set may include an HMVP candidate, and the motion information candidate list including the HMVP candidate may be constructed.

As one example, if merge mode is applied to the current block, the motion information candidate list may be a merge candidate list. As another example, if (A)MVP mode is applied to the current block, the motion information candidate list may be an MVP candidate list. If merge mode is applied to the current block, the HMVP candidate may be added to the merge candidate list if the number of available merge candidates (for example, including spatial merge candidates and temporal merge candidate) within the merge candidate list with respect to the current block is smaller than the maximum number of merge candidates. In this case, the HMVP candidate may be inserted to the back of the spatial and temporal candidates within the merge candidate list. In other words, an index larger than the indexes assigned to the spatial and temporal candidates within the merge candidate list may be assigned to the HMVP candidate. If (A)MVP mode is applied to the current block, the HMVP candidate may be added to the MVP candidate list if the number of available MVP candidates (derived based on spatial neighboring blocks and temporal neighboring blocks) within the MVP candidate list with respect to the current block is smaller than 2.

The decoding apparatus may derive motion information of the current block based on the motion information candidate list S2820.

The decoding apparatus may derive motion information of the current block based on the motion information candidate list. For example, if merge mode or MVP mode is applied to the current block, the HMVP candidate belonging to the HMVP candidate set may be used as a merge candidate or MVP candidate. For example, if merge mode is applied to the current block, the HMVP candidate belonging to the HMVP candidate set is included as a candidate of a merge candidate list, and the HMVP candidate may be indicated based on a merge index obtained from a bitstream among candidates belonging to the merge candidate list. In this case, an index may be assigned to the HMVP candidate within the merge candidate list with priority lower than spatial merge candidates and temporal merge candidate belonging to the merge candidate list. In other words, the index whose value is higher than the index values of the spatial merge candidates and temporal merge candidate may be assigned to the HMVP candidate. As another example, if MVP mode is applied to the current block, the HMVP candidate belonging to the HMVP candidate set may be included as a candidate of the merge candidate list, and the HMVP candidate may be indicated among candidates belonging to the MVP candidate list based on an MVP flag (or MVP index) obtained from a bitstream.

The decoding apparatus generates prediction samples with respect to the current block based on the derived motion information S2830. The decoding apparatus may perform inter prediction (motion compensation) based on the motion information and derive prediction samples by using reference samples indicated by the motion information on a reference picture.

The decoding apparatus generates reconstructed samples based on the prediction samples S2840. As described above, a reconstructed block/picture may be generated based on the reconstructed samples. As described above, the decoding apparatus may obtain residual information (including information about quantized transform coefficients) from the bitstream, derive residual samples based on the residual information, and generate the reconstructed samples based on the residual samples. Afterwards, as described above, an in-loop filtering process such as deblocking filtering, SAO and/or ALF process may be applied to the reconstructed picture to improve subjective/objective image quality depending on the needs.

In the embodiments described above, methods are described according to a flow diagram by using a series of steps and blocks. However, the corresponding embodiment is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of the embodiments of the present specification.

The method according to the embodiments of the present specification may be implemented in the form of software, and the encoding apparatus and/or decoding apparatus according to the present specification may be included in an apparatus that performs image processing, such as TV, computer, smartphone, set-top box, and display device.

When embodiments of the present specification are implemented by software, the aforementioned method may be implemented by a module (process or function) that performs the aforementioned function. The module may be stored in a memory and executed by a processor. The memory may be located inside or outside of the processor and may be connected to the processor via various well-known means. The processor may include Application-Specific Integrated Circuit (ASIC), other chipset, logical circuit and/or data processing device. The memory may include Read-Only Memory (ROM), Random Access Memory (RAM), flash memory, memory card, storage medium and/or other storage device. In other words, embodiments described in the present document may be implemented and performed on a processor, micro-processor, controller, or chip. For example, function units illustrated in each drawing may be implemented and performed on a computer, processor, micro-processor, controller, or chip. In this case, information (for example, information on instructions) or algorithm for implementation may be stored in a digital storage medium.

Also, the decoding apparatus and the encoding apparatus to which embodiments of the present specification are applied may include a multimedia broadcast transmission and reception device, mobile communication terminal, home cinema video device, digital cinema video device, surveillance camera, video communication device, real-time communication device for video communication, mobile streaming device, storage medium, camcorder, video on demand (VoD) service provision device, Over the top (OTT) video device, Internet streaming service provision device, 3D video device, virtual reality (VR) device, augmented reality (AR) device, video phone device, transportation means terminal (for example, vehicle (including self-driving vehicles) terminal, airplane terminal, and ship terminal), and medical video device; and may be used for processing a video signal or a data signal. For example, OTT video devices may include a game console, Bluray player, Internet connection TV, home theater system, smartphone, tablet PC, and digital video recorder (DVR).

Also, a processing method to which an embodiment(s) of the present specification is applied may be produced in the form of a program executed by a computer and may be stored in a computer-readable recording medium. Multimedia data having a data structure according to the embodiment(s) of the present specification may also be stored in a computer-readable recording medium. The computer-readable recording medium includes all kinds of storage devices and distributed storage devices in which computer-readable data are stored. The computer-readable recording medium may include, for example, a Bluray disk (BD), universal serial bus (USB), ROM, PROM, EPROM, EEPROM, RAM, CD-ROM, magnetic tape, floppy disk, and optical data storage device. Also, the computer-readable recording medium includes a media implemented in the form of a carrier (for example, transmission through the Internet). Also, a bitstream generated according to the encoding method may be stored in a computer-readable recording medium or transmitted through a wired or wireless communication network.

Also, the embodiment(s) of the present specification may be implemented as a computer program product in the form of program code, and the program code may be executed by a computer according to the embodiment(s) of the present specification. The program code may be stored on a computer-readable carrier.

Figure 30:
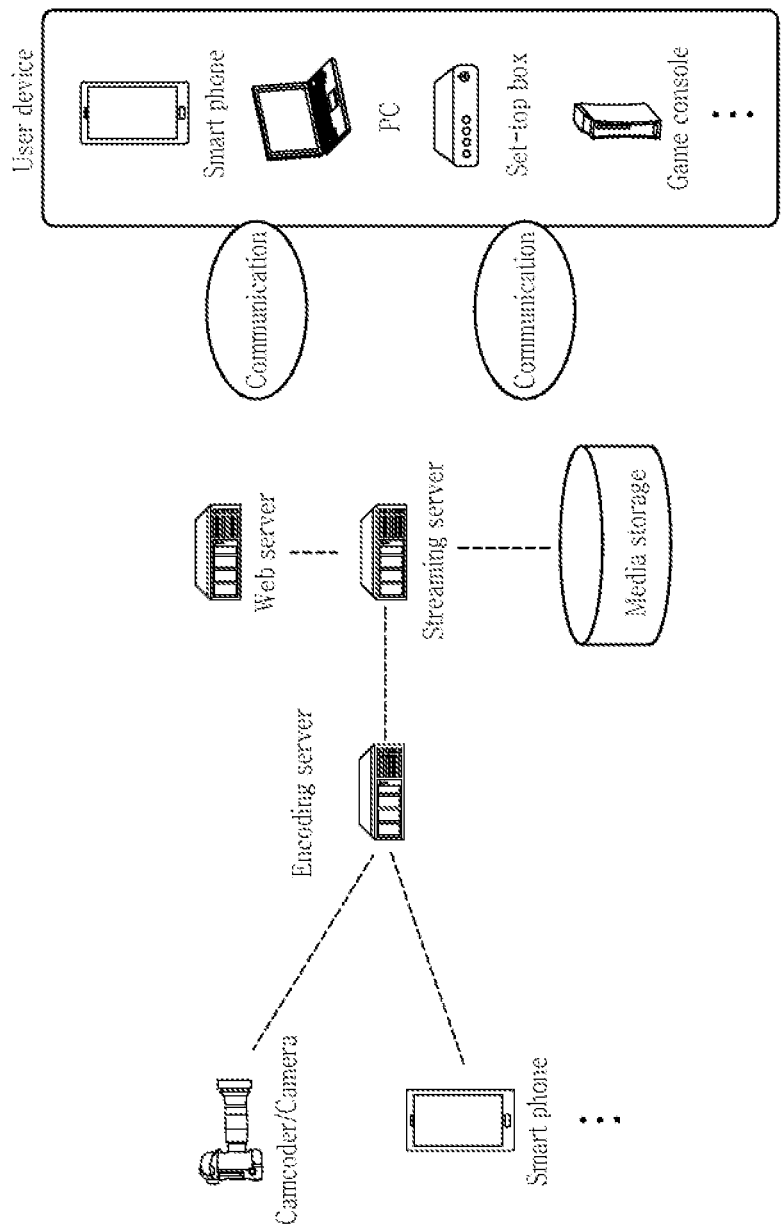
FIG. 30 illustrates an example of a contents streaming system to which embodiments disclosed in the present specification may be applied.

FIG. 30 illustrates an example of a contents streaming system to which embodiments disclosed in the present specification may be applied.

Referring to FIG. 30, the contents streaming system to which embodiments of the present specification is applied may largely include an encoding server, streaming server, web server, media storage, user device, and multimedia input device.

The encoding server performs the role of generating a bitstream by compressing contents input from multimedia input devices such as a smartphone, camera, or camcorder into digital data and transmitting the generated bitstream to the streaming server. As another example, if multimedia input devices such as a smartphone, camera, or camcorder directly produce a bitstream, the encoding server may be omitted.

The bitstream may be generated by an encoding method or a method for generating a bitstream to which embodiments of the present specification are applied, and the streaming server may temporarily store the bitstream while the bitstream is transmitted or received.

The streaming server performs the role of transmitting multimedia data to a user device based on a user request through a web server, and the web server performs the role of informing the user of which services are available. If the user requests a desired service from the web server, the web server transmits the request to the streaming server, and the streaming server transmits multimedia data to the user. At this time, the contents streaming system may include a separate control server, and in this case, the control server performs the role of controlling commands/responses between devices within the contents streaming system.

The streaming server may receive contents from a media storage and/or encoding server. For example, if contents are received from the encoding server, the contents may be received in real-time. In this case, to provide a smooth streaming service, the streaming server may store the bitstream for a predetermined time period.

Examples of the user device may include a mobile phone, smartphone, laptop computer, digital broadcast terminal, personal digital assistant (PDA), portable multimedia player (PMP), navigation terminal, slate PC, tablet PC, ultrabook, wearable device (for example, a smart watch or a smart glass), digital TV, desktop computer, and digital signage.

Each individual server within the contents streaming system may be operated as a distributed server, and in this case, data received by each server may be processed in a distributed manner.

What is claimed is:

1. An image decoding method performed by a decoding apparatus, the method comprising:
   deriving a history-based motion vector prediction (HMVP) candidate set for a current block;
   configuring a motion information candidate list based on an HMVP candidate comprised in the HMVP candidate set;
   deriving motion information of the current block based on the motion information candidate list;
   generating prediction samples for the current block based on the motion information; and
   generating reconstructed samples based on the prediction samples,
   wherein the HMVP candidate set is updated based on motion information of a previous block in a CTU row in a current tile, wherein the CTU row comprising the current block,
   wherein for CTUs of the CTU row in the current tile, the HMVP candidate set is initialized only at a specific CTU among the CTUs of the CTU row in the current tile, and
   the specific CTU is a firstly-ordered CTU among the CTUs of the CTU row in the current tile.

2. The method of claim 1, wherein a slice data syntax includes a field for one or more CTUs in a slice, and
   wherein information representing the specific CTU in which the HMVP candidate set is initialized is included in the slice data syntax.

3. The method of claim 1, wherein based on the HMVP candidate set being initialized, the number of HMVP candidates belonging to the HMVP candidate set is set to 0.

4. The method of claim 1, wherein, based on the specific CTU being not the firstly-ordered CTU of the CTU row within a current picture but the firstly-ordered CTU of the CTU row within the current tile, the HMVP candidate set is initialized at the specific CTU.

5. The method of claim 1, wherein, based on a current CTU including the current block being determined to be the firstly-ordered CTU of the CTU row within the current tile, the HMVP candidate set includes an HMVP candidate derived based on motion information of a block processed earlier than the current block within the current CTU, and
based on a determination that the current CTU is not the firstly-ordered CTU of the CTU row within the current tile, the HMVP candidate set includes a first HMVP candidate derived based on motion information of a block processed earlier than the current block within the current CTU and a second HMVP candidate derived based on motion information of a block processed earlier within a previous CTU of the current CTU of the CTU row within the current tile.

6. The method of claim 1, wherein based on the current picture being divided into a plurality of tiles, the HMVP buffer is initialized per each CTU row in each tile.

7. The method of claim 1, wherein based on a merge mode being applied to the current block, the motion information candidate list is a merge candidate list, and the HMVP candidate belonging to the HMVP candidate set is included as a candidate of the merge candidate list; and
the HMVP candidate is indicated based on a merge index obtained from a bitstream among candidates belonging to the merge candidate list.

8. An image encoding method performed by an encoding apparatus, the method comprising:
deriving a history-based motion vector prediction (HMVP) candidate set with respect to a current block;
constructing a motion information candidate list based on HMVP candidates belonging to the HMVP candidate set;
deriving motion information of the current block based on the motion information candidate list;
generating prediction samples for the current block based on the motion information;
deriving residual samples based on the prediction samples; and
encoding image information including information about the residual samples,
wherein the HMVP candidate set is updated based on motion information of a previous block in a CTU row in a current tile, wherein the CTU row comprising the current block,
wherein for CTUs of the CTU row in the current tile, the HMVP candidate set is initialized only at a specific CTU among the CTUs iof the CTU row in the current tile, and
the specific CTU is a firstly-ordered CTU among the CTUs of the CTU row in the current tile.

9. The method of claim 8, wherein a slice data syntax includes a field for one or more CTUs in a slice, and
wherein information representing the specific CTU in which the HMVP candidate set is initialized is included in the slice data syntax.

10. The method of claim 8, wherein based on the specific CTU being not the firstly-ordered CTU of the CTU row within the current picture but the firstly-ordered CTU of the CTU row within the current tile, the HMVP candidate set is initialized at the specific CTU.

11. The method of claim 8, wherein based on the HMVP candidate set being initialized, the number of HMVP candidates belonging to the HMVP candidate set is set to 0.

12. The method of claim 8,
wherein based on a current CTU including the current block being determined to be the firstly-ordered CTU of the CTU row within the current tile, the HMVP candidate set includes an HMVP candidate derived based on motion information of a block processed earlier than the current block within the current CTU, and
based on a determination that the current CTU is not the firstly-ordered CTU of the CTU row within the current tile, the HMVP candidate set includes a first HMVP candidate derived based on motion information of a block processed earlier than the current block within the current CTU and a second HMVP candidate derived based on motion information of a block processed earlier within a previous CTU of the current CTU of the CTU row within the current tile.

13. The method of claim 8, wherein based on the current picture being divided into a plurality of tiles, the HMVP buffer is initialized per each CTU row in each tile.

14. The method of claim 8, wherein based on a merge mode being applied to the current block, the motion information candidate list is a merge candidate list, and the HMVP candidate belonging to the HMVP candidate set is included as a candidate of the merge candidate list; and
a merge index included in the image information indicates the HMVP candidate among candidates belonging to the merge candidate list.

15. A non-transitory computer-readable digital storage medium, the digital storage medium storing instruction information that causes a processor to perform the image decoding method of claim 1.

* * * * *